US011412233B2

(12) United States Patent
Liu et al.

(10) Patent No.: US 11,412,233 B2
(45) Date of Patent: *Aug. 9, 2022

(54) METHODS FOR MR-DIBR DISPARITY MAP MERGING AND DISPARITY THRESHOLD DETERMINATION

(71) Applicant: Ostendo Technologies, Inc., Carlsbad, CA (US)

(72) Inventors: Wankai Liu, Fujian (CN); Zahir Y. Alpaslan, San Marcos, CA (US); Hussein S. El-Ghoroury, Carlsbad, CA (US)

(73) Assignee: Ostendo Technologies, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/182,115

(22) Filed: Feb. 22, 2021

(65) Prior Publication Data
US 2021/0195217 A1    Jun. 24, 2021

Related U.S. Application Data

(63) Continuation of application No. 16/378,228, filed on Apr. 8, 2019, now Pat. No. 10,931,956.
(Continued)

(51) Int. Cl.
*H04N 19/179* (2014.01)
*H04N 19/186* (2014.01)

(52) U.S. Cl.
CPC ......... *H04N 19/179* (2014.11); *H04N 19/186* (2014.11)

(58) Field of Classification Search
CPC .......................... H04N 19/179; H04N 19/186
See application file for complete search history.

(56) References Cited

U.S. PATENT DOCUMENTS

| 5,613,048 A | 3/1997 | Chen et al. |
| 6,009,188 A | 12/1999 | Cohen et al. |

(Continued)

FOREIGN PATENT DOCUMENTS

| GB | 2587539 A | 3/2021 |
| TW | 201531745 A | 8/2015 |

(Continued)

OTHER PUBLICATIONS

International Search Report and Written Opinion for International Application No. PCT/US18/35713, dated 20180821, 17 pages.

(Continued)

*Primary Examiner* — Irfan Habib
(74) *Attorney, Agent, or Firm* — Greg Caldwell, Esq.; W. Eric Boyd, Esq.

(57) ABSTRACT

Methods and systems for light field image encoding and decoding are disclosed. According to some embodiments, scene metadata and input light field images associated with a scene are received. A first encoding operation is performed on the scene metadata and input light field images to generate reference images, reference disparity information, and an order of reference views. A second encoding operation is performed based on the reference images and reference disparity information to output light field encoded data. The light field encoded data includes the encoded reference images, the encoded reference disparity information, and the order of reference views. The light field encoded data is transmitted.

22 Claims, 8 Drawing Sheets

Related U.S. Application Data

(60) Provisional application No. 62/656,839, filed on Apr. 12, 2018.

(56) References Cited

U.S. PATENT DOCUMENTS

| | | | |
|---|---|---|---|
| 6,097,394 | A | 8/2000 | Levoy et al. |
| 6,738,533 | B1 | 5/2004 | Shum et al. |
| 6,963,431 | B2 | 11/2005 | Holzbach et al. |
| 7,623,560 | B2 | 11/2009 | El-Ghoroury et al. |
| 7,767,479 | B2 | 8/2010 | El-Ghoroury et al. |
| 7,829,902 | B2 | 11/2010 | El-Ghoroury et al. |
| 7,856,149 | B2 | 12/2010 | Govindaswamy et al. |
| 7,978,407 | B1 | 7/2011 | Connor |
| 8,049,231 | B2 | 11/2011 | El-Ghoroury et al. |
| 8,243,770 | B2 | 8/2012 | El-Ghoroury et al. |
| 8,284,237 | B2 | 10/2012 | Chen et al. |
| 8,401,316 | B2 | 3/2013 | Babacan et al. |
| 8,567,960 | B2 | 10/2013 | El-Ghoroury et al. |
| 8,681,185 | B2 | 3/2014 | Guncer |
| 8,854,724 | B2 | 10/2014 | El-Ghoroury et al. |
| 8,928,969 | B2 | 1/2015 | Alpaslan et al. |
| 8,970,646 | B2 | 3/2015 | Guncer |
| 9,179,126 | B2 | 11/2015 | El-Ghoroury et al. |
| 9,195,053 | B2 | 11/2015 | El-Ghoroury et al. |
| 9,414,087 | B2* | 8/2016 | Akeley ............... H04N 19/60 |
| 9,462,164 | B2 | 10/2016 | Venkataraman et al. |
| 9,681,069 | B2 | 6/2017 | El-Ghoroury et al. |
| 9,712,764 | B2 | 7/2017 | El-Ghoroury et al. |
| 9,774,800 | B2 | 9/2017 | El-Ghoroury et al. |
| 9,779,515 | B2 | 10/2017 | El-Ghoroury et al. |
| 11,051,039 | B2* | 6/2021 | Alpaslan ............. H04N 13/232 |
| 11,172,222 | B2* | 11/2021 | Alpaslan ............. H04N 19/80 |
| 2002/0067521 | A1 | 6/2002 | Holzbach et al. |
| 2008/0043095 | A1 | 2/2008 | Vetro et al. |
| 2008/0198920 | A1 | 8/2008 | Yang et al. |
| 2009/0086170 | A1 | 4/2009 | El-Ghoroury et al. |
| 2009/0278998 | A1 | 11/2009 | El-Ghoroury et al. |
| 2010/0003777 | A1 | 1/2010 | El-Ghoroury et al. |
| 2010/0007804 | A1 | 1/2010 | Guncer |
| 2010/0066921 | A1 | 3/2010 | El-Ghoroury et al. |
| 2010/0156894 | A1 | 6/2010 | Holler et al. |
| 2010/0220042 | A1 | 9/2010 | El-Ghoroury et al. |
| 2010/0225679 | A1 | 9/2010 | Guncer |
| 2010/0231585 | A1 | 9/2010 | Weiblen |
| 2010/0271511 | A1 | 10/2010 | Ma et al. |
| 2011/0058021 | A1 | 3/2011 | Chen et al. |
| 2011/0134227 | A1 | 6/2011 | Shin |
| 2012/0033113 | A1 | 2/2012 | El-Ghoroury et al. |
| 2012/0183232 | A1 | 7/2012 | Babacan et al. |
| 2012/0213270 | A1 | 8/2012 | Baraniuk et al. |
| 2012/0249750 | A1 | 10/2012 | Izzat et al. |
| 2012/0293635 | A1 | 11/2012 | Sharma et al. |
| 2013/0010057 | A1* | 1/2013 | Borel ............... H04N 13/128 348/42 |
| 2013/0077880 | A1 | 3/2013 | Venkataraman et al. |
| 2013/0077882 | A1 | 3/2013 | Venkataraman et al. |
| 2013/0082905 | A1* | 4/2013 | Ranieri ............... H04N 13/32 345/32 |
| 2013/0141895 | A1 | 6/2013 | Alpaslan et al. |
| 2013/0258451 | A1 | 10/2013 | El-Ghoroury et al. |
| 2013/0294504 | A1 | 11/2013 | Mishourovsky et al. |
| 2013/0321581 | A1 | 12/2013 | El-Ghoroury et al. |
| 2014/0085417 | A1* | 3/2014 | Shi ................. H04N 13/229 348/43 |
| 2014/0232822 | A1* | 8/2014 | Venkataraman .......... G06T 7/60 348/43 |
| 2014/0347361 | A1 | 11/2014 | Alpaslan et al. |
| 2015/0015669 | A1* | 1/2015 | Venkataraman ..... H04N 19/136 348/43 |
| 2015/0033539 | A1 | 2/2015 | El-Ghoroury et al. |
| 2015/0199794 | A1 | 7/2015 | Venkataraman et al. |
| 2015/0201176 | A1* | 7/2015 | Graziosi ............. H04N 13/111 348/43 |
| 2016/0021355 | A1 | 1/2016 | Alpaslan et al. |
| 2016/0028935 | A1 | 1/2016 | El-Ghoroury et al. |
| 2016/0100198 | A1 | 4/2016 | Matsui et al. |
| 2016/0142615 | A1* | 5/2016 | Liang ................. G06T 5/001 348/222.1 |
| 2016/0182782 | A1 | 6/2016 | El-Ghoroury et al. |
| 2016/0191765 | A1 | 6/2016 | El-Ghoroury et al. |
| 2016/0191823 | A1 | 6/2016 | El-Ghoroury et al. |
| 2016/0357147 | A1 | 12/2016 | Falkenberg et al. |
| 2016/0360177 | A1* | 12/2016 | Graziosi ............. H04N 13/128 |
| 2017/0070751 | A1 | 3/2017 | Shimizu et al. |
| 2017/0142427 | A1* | 5/2017 | Graziosi ............... G06T 9/20 |
| 2017/0236295 | A1 | 8/2017 | El-Ghoroury et al. |
| 2017/0257649 | A1 | 9/2017 | Bourouihiya |
| 2018/0097867 | A1 | 4/2018 | Pang et al. |
| 2018/0003522 | A1 | 5/2018 | Alpaslan |
| 2018/0350038 | A1 | 12/2018 | Cen et al. |
| 2018/0352209 | A1 | 12/2018 | Liu et al. |
| 2018/0352254 | A1* | 12/2018 | Alpaslan ............. H04N 13/232 |
| 2018/0359489 | A1 | 12/2018 | Lakshman et al. |
| 2019/0068973 | A1* | 2/2019 | Hamilton ............... G06T 7/586 |
| 2019/0158877 | A1 | 5/2019 | Thoreau et al. |
| 2019/0320186 | A1* | 10/2019 | Liu ................. H04N 19/186 |
| 2019/0394488 | A1 | 12/2019 | Alpaslan et al. |
| 2020/0036988 | A1* | 1/2020 | Graziosi ............. H04N 19/103 |

FOREIGN PATENT DOCUMENTS

| | | |
|---|---|---|
| TW | 201904279 A | 1/2019 |
| TW | 201944775 A | 11/2019 |
| WO | 2016172384 A1 | 10/2016 |
| WO | 2019199854 A1 | 10/2019 |

OTHER PUBLICATIONS

Non-Final Office Action for U.S. Appl. No. 17/356,221, dated 20210910, 10 pages.

Notice of Allowance for U.S. Appl. No. 17/356,221, dated 20210921, 8 pages.

Oh, Kwan-Jung, et al., "Hole-Filling Method Using Depth Based In-Painting for View Synthesis in Free Viewpoint Television (FTV) and 3D Video", Picture Coding Symposium (PCS) 2009, May 6-8, 2009, 4 pages.

Piao, Yan et al., "Sub-sampling Elemental Images for Integral Imaging Compression", International Conference on Audio Language and Image Processing (ICALIP), 2010, pp. 1164-1168.

Sjostrom, Marten et al., "Improved Depth-Image-Based Rendering Algorithm," 3DTV Conference: The True Vision—Capture, Transmission and Display of 3D Video (3DTV-CON) (2011), 4 pages.

Solh, Mashhour et al., "Depth Adaptive Hierarchical Hole-Filling for DIBR-Based 3D Videos," Proceedings of the SPIE, Three-Dimensional Image Processing (3DIP) and Applications II, vol. 8290 (2012), pp. 829004-1 to 829004-11.

Takahashi, Keita, "Theoretical Analysis of View Interpolation With Inaccurate Depth Information," IEEE Transactions on Image Processing, vol. 21, No. 2 (Feb. 2012), pp. 718-732.

Vetro, Anthony et al., "Overview of the Stereo and Multiview Video Coding Extensions of the H .264/M PEG-4 AVC Standard," Proceedings of the IEEE, vol. 99, No. 4 (Apr. 2011), pp. 626-642.

Wang, Zhou et al., "Image Quality Assessment: From Error Visibility to Structural Similarity," IEEE Transactions on Image Processing, vol. 13, No. 4 (Apr. 2004), pp. 600-612.

Wegner, Krzysztof et al., "Enhanced View Synthesis Reference Software (VSRS) for Free-viewpoint Television", International Organisation for Standardisation, ISO/IEC JTC1/SC29/WG11, MPEG2013/M31520, Geneva, Switzerland, Oct. 2013, 4 pages.

Wetzstein, G., et al., "Compressive Light Field Displays," IEEE Computer Graphics and Applications, vol. 32, Issue 5 (Sep./Oct. 2012), pp. 6-11.

Williams, J. et al., "An Extended Kalman Filtering Approach to High Precision Stereo Image Matching", Proceedings of the 1998 International Conference on Image Processing (ICIP), vol. 2, Oct. 4-7, 1998, pp. 157-161.

Yan, P. et al., "Integral image compression based on optical characteristic", IET Computer Vision, vol. 5, No. 3, 2011, pp. 164-168.

(56) References Cited

OTHER PUBLICATIONS

Yang, Lu et al., "Artifact reduction using reliability reasoning for image generation of FTV", Journal of Visual Communication and Image Representation, vol. 21, 2010, pp. 542-560.
Zhang, Cha et al., "A survey on image-based rendering—representation, sampling and compression", Signal Processing: Image Communication, vol. 19, 2004, pp. 1-28.
Zhao, Yin et al., "Suppressing Texture-Depth Misalignment for Boundary Noise Removal in View Synthesis," 28th Picture Coding Symposium, PSC2010, Naoova, Japan (Dec. 8-10, 2010), pp. 30-33.
First Office Action for Taiwan Patent Application No. 107119054, dated 20211102, 10 pages.
Alpaslan, Z.Y., et al., "Development and Deployment of a Tiled Full Parallax Light Field Display System," Proceedings of the SPIE, Applications of Digital Image Processing XXXIX, vol. 9971 (Sep. 27, 2016), pp. 99710J-1 to 99710J-8.
Alpaslan, Z.Y., et al., "Parametric Characterization of Perceived Light Field Display Resolution," SID Symposium Digest of Technical Papers, vol. 47, No. 1 (May 2016), pp. 1241-1245.
Alpaslan, Z.Y., et al., "Small Form Factor Full Parallax Tiled Light Field Display,", Proceedings of Electronic maging, SPIE-IS&T, vol. 9391 (Feb. 9, 2015), pp. 93910E-1 to 93910E-10.
Candes, Emmanuel et al., "Near Optimal Signal Recovery From Random Projections: Universal Encoding Strategies?", 2004, pp. 1-39.
Candes, Emmanuel J. et al., "Robust Uncertainty Principles: Exact Signal Reconstruction From Highly Incomplete Frequency Information," IEEE Transactions on Information Theory, vol. 52, No. 2 (Feb. 2006), pp. 489-509.
Chai, Jin-Xiang et al., "Plenoptic Sampling," Proceedings of the 27th Annual Conference on Computer Graphics and Interactive Techniques—SIGGRAPH '00, 2000, pp. 307-318.
Conti, Caroline et al., "Light-Field Video Coding Using Geometry-Based Disparity Compensation", 2014 3DTV-Conference: The True Vision—Capture, Transmission and Display of 3D Video (3DTV-CON), IEEE, Jul. 2, 2014, pp. 1-4.
Donoho, David L. , "Compressed Sensing", IEEE Transactions on Information Theory, vol. 52, No. 4, Apr. 2006, pp. 1289-1306.
Dricot, A. et al., "Integral Images Compression Scheme Based on View Extraction", 2015 23rd European Signal Processing Conference (EUSIPCO), Aug. 31, 2015, pp. 101-105.
El-Ghoroury, H.S. et al., "Quantum Photonic Imager (QPI): A New Display Technology and Its Applications," Proceedings of The International Display Workshops, vol. 21 (Dec. 3, 2014), pp. 1292-1295.
Fehn, Christoph , "Depth-Image-Based Rendering (DIBR), Compression and Transmission for a New Approach an 3D-TV," Proc. of SPIE Stereoscopic Displays and Virtual Reality Systems XI (2004), pp. 93-104.
Fehn, Christoph, "A 3D-TV Approach Using Depth-Image-Based Rendering (DIBR)," Proceedings of Picture Coding Symposium, San Francisco, CA, USA Dec. 2004, 6 pages.
Furihata, H., et al., "Novel view synthesis with residual error feedback for FTV," Stereoscopic Displays and Applications XXI, Proceedings of the SPIE-IS&T Electronic Imaging, vol. 7542, Jan. 2010, pp. 75240K-1 to 75240K-12.
Gilliam, C., et al., "Adaptive Plenoptic Sampling," 2011 18th IEEE International Conference on Image Processing, 2011, pp. 2581-2584.
Gortler, Steven J., et al., "The Lumigraph," Proceedings of the 23rd Annual Conference on Computer Graphics and Interactive Techniques (SIGGRAPH '96), 1996, pp. 43-52.
Graziosi, Danillo B., et al., "Compression for Full-Parallax Light Field Displays," Stereoscopic Displays and Applications XXV, Proceedings of SPIE-IS&T Electronic Imaging, vol. 9011, Mar. 6, 2014, pp. 90111A-1 to 90111A-14.
Graziosi, Danillo B., et al., "Depth assisted compression of full parallax light fields," Stereoscopic Displays and Applications XXVI, Proceedings of SPIE-IS&T Electronic Imaging, vol. 9391, Mar. 17, 2015, pp. 93910Y-1 to 93910Y-15.

Heide, F., et al., "Adaptive Image Synthesis for Compressive Displays," Proc. of SIGGRAPH 2013 (ACM Transactions on Graphics), vol. 32, No. 4 (2013), 11 pages.
Hoffman, D.M. et al., "Vergence-accommodation conflicts hinder visual performance and cause visual fatigue," Journal of Vision, vol. 8, No. 3 (2008), pp. 1-30.
International Organisation For, Standardisation , "Use Cases and Requirements on Free-viewpoint Television (FTV)," ISO/IEC JTC1/SC29/WG11, MPEG2013/N14104, Geneva, Switzerland (Oct. 2013), 12 pages.
International Organization for Standardisation, "Call for Proposals on 3D Video Coding Technology," ISO/IEC JTC1/SC29/WG11, MPEG2011/N12036, Geneva, Switzerland, Mar. 2011, 20 pages.
International Preliminary Report on Patentability for International Patent Application No. PCT/US2019/026619, dated Oct. 13, 2020, 17 pages.
International Preliminary Report on Patentability for International Patent Application No. PCT/US2019/039165, dated Dec. 29, 2020, 6 pages.
International Search Report and Written Opinion for International Patent Application No. PCT/US2018/035730, dated Sep. 10, 2018 , 17 pages.
International Search Report and Written Opinion for International Patent Application No. PCT/US2019/026619, dated Sep. 17, 2019, 24 pages.
International Search Report and Written Opinion for International Patent Application No. PCT/US2019/039165, dated Sep. 24, 2019, 8 pages.
International Search Report and Written Opinion of International Patent Application No. PCT/US2018/035713, dated Aug. 21, 2018, 17 pages.
International Telecommunication, Union , "H.264, Series H: Audiovisual and MultiMedia Systems, Infrastructure of audiovisual services—Coding of moving video, Advanced video coding for generic audiovisual services," ISO/IEC 14496-10:2003, Coding of Audiovisual Objects—Part 10: Advanced Video Coding, ITU-T Recommendation H.264 (Mar. 2005), 343 pages.
Iwadate, Y. et al., "Generating Integral Image from 3D Object by Using Oblique Projection", 18th International Display Workshops 2011 (IDS '11) (Dec. 7-9, 2011), pp. 269-272.
Lee, Cheon et al., "View Synthesis using Depth Map for 3D Video," Proceedings of 2009 APSIPA Annual Summit and conference, Sapporo, Japan (2009), pp. 350-357.
Levoy, Marc, et al., "Light Field Rendering," Computer Graphics, SIGGRAPH 96 Proceedings, 1996, pp. 31-42.
Li, Li, et al., "Pseudo Sequence based 2-D hierarchical reference structure for Light-Field Image Compression," ARXIV.ORG, Cornell University Library, 201 Olin Library Cornell University, Ithaca, NY, Dec. 21, 2016, 10 pages.
Li, Yun et al., "Scalable Coding of Plenoptic Images by Using a Sparse Set and Disparities", IEEE Transactions on Image Processing, vol. 25, No. 1, Jan. 2016, pp. 80-91.
Lim, Chongsoon, et al., "Reference Lists For B Pictures Under Low Delay Constraints", Joint Collaborative Team an Video Coding (JCT-VC) of ITU-T SG16 WP3 and ISO/IEC JTC1/SC29/WG11, 4th Meeting: Daegu, KR, Document: JCTVC-D093, Jan. 20-28, 2011, pp. 1-7.
Liu, Shujie, et al., "New Depth Coding Techniques With Utilization of Corresponding Video", IEEE Transactions on Broadcasting, vol. 57, No. 2, Jun. 2011, oo. 551-561.
Lucente, Mark , "Diffraction-Specific Fringe Computation for Electro-Holography," Doctoral Thesis Dissertation, MIT Dept. of Electrical Engineering and Computer Science (Sep. 1994), 171 pages.
Magnor, M., et al., "Data Compression for Light-Field Rendering," IEEE Transactions on Circuits and Systems for Video Technology, vol. 10, No. 3 (Apr. 2000), pp. 338-343.
Malvar, Henrique S. et al., "Lifting-based reversible color transformations for image compression", Proc. of SPIE of Applications of Digital Image Processing, vol. 7073, 2008, pp. 707301-1 to 707301-10.
Mori, Yuji et al., "View generation with 3D warping using depth information for FTV", Signal Processing: Image Communication, vol. 24 (2009), pp. 65-72.

(56) References Cited

OTHER PUBLICATIONS

Morvan, Yannick et al., "Platelet-based coding of depth maps for the transmission of multiview images", Proceedings of the SPIE, Stereoscopic Displays and Applications, vol. 6055 (Feb. 2006), 12 pages.
Non-Final Office Action for U.S. Appl. No. 15/994,328, dated Jan. 7, 2020, 13 pages.
Non-Final Office Action for U.S. Appl. No. 15/994,870, dated Apr. 22, 2020, 19 pages.
Non-Final Office Action for U.S. Appl. No. 16/378,228, dated Mar. 5, 2020, 10 pages.
Non-Final Office Action for U.S. Appl. No. 16/452,008, dated Apr. 15, 2020, 23 pages.
Notice of Allowance for Taiwan Patent Application No. 108112656, dated Dec. 21, 2020, 3 pages.
Notice of Allowance for U.S. Appl. No. 15/994,870, dated Nov. 13, 2020, 8 pages.
Notice of Allowance for U.S. Appl. No. 16/378,228, dated Oct. 16, 2020, 6 pages.
Notice of Allowance for U.S. Appl. No. 16/452,008, dated Jan. 27, 2021, 10 pages.
Office Action for Taiwan Patent Application No. 108112656, dated Mar. 13, 2020, 10 pages.
Oh, Kwan-Jung, et al., "Depth Reconstruction Filter and Down/Up Sampling for Depth Coding in 3-D Video", IEEE Signal Processing Letters, vol. 16, No. 9, Sep. 2009, pp. 747-750.
Examination Report for UK Patent Application No. 2017224.3, dated Feb. 14, 2022, 2 pages.
First Office Action for Taiwan Patent Application No. 107119070, dated Feb. 7, 2022, 15 pages.

\* cited by examiner

METHODS FOR MR-DIBR DISPARITY MAP MERGING AND DISPARITY THRESHOLD DETERMINATION

CROSS REFERENCE TO RELATED APPLICATIONS

This application is a continuation of U.S. patent application Ser. No. 16/378,228 filed Apr. 8, 2019, which claims the benefit of U.S. Provisional Application No. 62/656,839 filed on Apr. 12, 2018, the disclosures of which are incorporated herein by reference.

TECHNICAL FIELD

Embodiments of the invention generally relate to light field display data compression. More specifically, embodiments of the invention relate to improvements in multiple reference depth image-based rendering (MR-DIBR) disparity map merging that enable compression of light field images using reference depth or disparity.

BACKGROUND

Light field image data compression has become necessary to accommodate the large amounts of image data associated with full parallax and full color light field displays, which image data generally comprises millions of elemental images each comprising many millions of pixel data. Prior art light field compression methods using depth image-based rendering (DIBR), while efficient for compression of elemental images, are often unable to incorporate the occlusion and hole filling functions needed to provide high quality light field images at acceptable compression ratios.

An example of such a prior art DIBR compression method is disclosed in, for instance, U.S. Patent Publication No. 2016/0360177 entitled, "Methods for Full Parallax Compressed Light Field Synthesis Utilizing Depth Information", the disclosure of which is incorporated herein by reference.

Light field displays modulate light's intensity and direction in order to reconstruct three-dimensional (3D) objects in a scene without requiring specialized glasses for viewing. To accomplish this, light field displays utilize a large number of views which imposes several challenges in the image acquisition and transmission stages of the 3D processing chain. Data compression is a necessary tool to accommodate the very large data sets involved in light field display images. To accommodate the associated large data sets, it is common that such systems sub-sample views at the image generation stage and then reconstruct the sub-sampled views at the display stage.

For example, in Yan et al., "Integral image compression based on optical characteristics," *Computer Vision, IET*, vol. 5, no. 3, pp. 164, 168 (May 2011) and Yan Piao et al., "Sub-sampling elemental images for integral imaging compression," 2010 *International Conference on Audio Language and Image Processing (ICALIP)*, pp. 1164, 1168 (23-25 Nov. 2010), the authors perform sub-sampling of elemental images based on the optical characteristics of the display system.

A more formal approach to light field sampling is found in the works of Jin-Xiang Chai et al., (2000) "Plenoptic sampling", in *Proceedings of the 27th annual conference on Computer graphics and interactive techniques* (SIGGRAPH '00) and Gilliam, C. et al., "Adaptive plenoptic sampling", 2011 *18th IEEE International Conference on Image Processing (ICIP)*, pp. 2581, 2584 (11-14 Sep. 2011). In order to reconstruct the light field views at the display side, several different methods are used ranging from computer graphics methods to image-based rendering methods.

In computer graphics methods, the act of creating a scene or a view of a scene is known as "view rendering". In computer graphics, a complex 3D geometrical model incorporating lighting and surface properties from the camera point of view is used. This view rendering approach generally requires multiple complex operations and a detailed knowledge of the scene geometry.

Alternatively, Image-Based Rendering (IBR) can replace the use of complex 3D geometrical models with the use of multiple surrounding viewpoints used to synthesize views directly from input images that over-sample the light field. Although IBR generates realistic views, it requires a more intensive data acquisition process, data storage, and redundancy in the light field. To reduce this data handling penalty, an improved IBR method, referred to as Depth Image-Based Rendering (DIBR), utilizes depth information from a 3D geometrical model in order to reduce the number of required IBR views. (See, e.g., U.S. Pat. No. 8,284,237, "View Synthesis Reference Software (VSRS) 3.5," wg11.sc29.org, March 2010, and C. Fehn, "3D-TV Using Depth-Image-Based Rendering (DIBR)," in Proceedings of Picture Coding Symposium, San Francisco, Calif., USA, December 2004). In the DIBR method, each view has a depth associated with each pixel position, known as a depth map, which depth map is used to synthesize the absent views.

DIBR methods typically have three distinct steps: namely, 1) view warping (or view projection), 2) view merging, and 3) hole filling.

View warping is the re-projection of a scene captured by one camera to the image plane of another camera. This process utilizes the geometry of the scene provided by the per-pixel depth information within the reference view and the characteristics of the capturing device, i.e., the intrinsic (e.g., focal length, principal point) and extrinsic (e.g., rotation, 3D position) parameters of the camera (C. Fehn, "3D-TV Using Depth-Image-Based Rendering (DIBR)," in Proceedings of Picture Coding Symposium, San Francisco, Calif., USA, December 2004).

The view warping/view projection step is sometimes performed in two separate stages: a forward warping stage that projects only the disparity values, and a backward warping stage that fetches the color value from the references. Since disparity warping can be affected by rounding and depth quantization, an optional disparity filtering block may be added to the system to correct erroneous warped disparity values.

After one reference view is warped, portions of the target image or view may still be unknown. Since objects at different depths move with different apparent speeds, part of the scene hidden by one object in the reference view may be disoccluded or come into view in the target view while the color information of this part of the target view is not available from the reference view. Typically, multiple reference views such as a first reference view and a second reference view are used to cover the scene from multiple camera viewpoints so that disoccluded portions of one reference view can be obtained from another reference view. With multiple reference views, not only can the disoccluded portions of the scene be obtained from the different reference views, but portions of the scene can be visualized by multiple references views at the same time. Hence, the warped views of the reference views may be complementary and overlapping at the same time.

View merging is the operation of bringing the multiple reference views together into a single view. If pixels from different reference views are mapped to the same position, the depth value is used to determine the dominant view, which will be given by either the closest view or an interpolation of several reference views.

Even with multiple reference views, the possibility exists that a part of the scene visualized in the target view has no correspondence to any color information in the reference views. Those positions lacking color information are referred to as "holes" and several hole filling methods have been proposed in the prior art to fill such holes with color information from surrounding pixel values. Usually holes are generated due to object disocclusion and missing color information correlated to the background color. Several methods to fill in holes according to background color information have been proposed (e.g., Kwan-Jung Oh et al., "Hole filling method using depth based in-painting for view synthesis in free viewpoint television and 3-D video, "*Picture Coding Symposium,* 2009. PCS 2009, pp. 1, 4, 6-8, May 2009).

Due to resolution limitations of many display devices, DIBR methods have not yet been fully satisfactorily applied to full parallax light field images. However, with the advent of high resolution display devices having very small pixel pitches (for example, U.S. Pat. No. 8,567,960), view synthesis of full parallax light fields using DIBR techniques is now feasible.

In Levoy et al., light ray interpolation between two parallel planes is utilized to capture a light field and reconstruct its view points (See, e.g., Marc Levoy et al., (1996) "Light field rendering" in *Proceedings of the 23rd annual conference on Computer graphics and interactive techniques* (SIGGRAPH '96)). However, to achieve realistic results, this approach requires huge amounts of data be generated and processed. If the geometry of the scene, specifically depth, is taken into account, then a significant reduction in data generation and processing can be realized.

In Steven J. Gortler et al., (1996) "The lumigraph" in *Proceedings of the 23rd annual conference on Computer graphics and interactive techniques* (SIGGRAPH '96), the authors propose the use of depth to correct the ray interpolation, and in Jin-Xiang Chai et al., (2000) "Plenoptic sampling" in *Proceedings of the 27th annual conference on Computer graphics and interactive techniques* (SIGGRAPH '00), it was shown that view rendering quality is proportional to the number of views and the available depth. When more depth information is used, fewer reference views are needed. Disadvantageously though, depth image-based rendering methods have been error-prone due to inaccurate depth values and due to the precision limitation of synthesis methods.

Depth acquisition is a complicated problem in and of itself. Light field imaging systems generally utilize an array of cameras where the depth of an object is estimated by corresponding object features at different camera positions. This approach is prone to errors due to occlusions or smooth surfaces in the scene. Recently, several active methods for depth acquisition have been used, such as depth cameras and time-of-flight cameras. Nevertheless, the captured depth maps present noise levels that, despite low amplitude, adversely affect the view synthesis procedure.

In order to cope with inaccurate scene geometry information, certain conventional methods apply a pre-processing step to filter the acquired depth maps. For example, in Kwan-Jung Oh et al., "Depth Reconstruction Filter and Down/Up Sampling for Depth Coding in 3-D Video," *Signal Processing Letters, IEEE*, vol. 16, no. 9, pp. 747,750 (September 2009), a filtering method is proposed to smooth the depth map while enhancing its edges. In Shujie Liu et al., "New Depth Coding Techniques With Utilization of Corresponding Video", *IEEE Transactions on Broadcasting*, vol. 57, no. 2, pp. 551, 561, (June 2011), a trilateral filter is proposed, which adds the corresponding color information to a conventional bilateral filter to improve the matching between color and depth. Nevertheless, the pre-processing of depth information does not eliminate synthesis artifacts and is computationally intensive and impractical for low-latency systems.

A known problem relating to view merging is the color mismatch that occurs between views. In Yang L et al., (2010) "Artifact reduction using reliability reasoning for image generation of FTV" J Vis Commun Image Represent, vol. 21, pp 542-560 (July-August 2010), the authors propose the warping of a reference view to another reference view position in order to verify the correspondence between the two references. Unreliable pixels (that is, pixels that have a different color value in the two references) are not used during warping. In order to preserve the number of reference pixels, the authors in "Novel view synthesis with residual error feedback for FTV," in Proc. Stereoscopic Displays and Applications XXI, vol. 7524, January 2010, pp. 75240L-1-12 (H. Furihata et al.) propose the use of a color-correcting factor obtained from the difference between the corresponding pixels in the two reference views. Although this proposed method improves rendering quality, the improvement comes at the cost of increased computational time and memory resources to needed check pixel color and depth.

Conventional synthesis methods are optimized for reference views that are relatively close to each other and such DIBR methods are less effective for light field sub-sampling, where the reference views are further apart from each other. Furthermore, to reduce the associated data handling loads, these conventional methods for view synthesis usually target only horizontal parallax views and vertical parallax information is left unprocessed.

In the process of 3D coding standardization (ISO/IEC JTC1/SC29/WG11, Call for Proposals on 3D Video Coding Technology, Geneva, Switzerland, March 2011), view synthesis is being considered as part of the 3D display processing chain since it allows the decoupling of the capturing and the display stages. By incorporating view synthesis at the display side, fewer views need to be captured.

While the synthesis procedure is not part of the norm, the Moving Picture Experts Group (MPEG) group provides a View Synthesis Reference Software (VSRS), as disclosed in U.S. Pat. No. 8,284,237, that may be used in the evaluation of 3D video systems. The VSRS software implementation techniques for view synthesis, including all three stages: view warping, view merging and hole filling. Since VSRS can be used with any kind of depth map (including ground-truth depth maps obtained from computer graphics models up to estimated depth maps from stereo pair images), many sophisticated techniques are incorporated to adaptively deal with depth map imperfections and synthesis inaccuracies.

For the VSRS synthesis, only two views are used to determine the output, i.e., a left view and a right view. First, the absolute value of the difference between the left and right depths is compared to a pre-determined threshold. If this difference is larger than a pre-determined threshold (indicating that the depth values are very different from each other, and possibly related to objects in different depth layers), then the smallest depth value determines the object that is closest to the camera, and the view is assumed to be either the left view or the right view. In case the depth values are relatively close to each other, then the number of holes is used to determine the output view. The absolute difference between the number of holes in the left and right views is compared to a pre-determined threshold. In case both views have a similar number of holes, then the average of the pixels coming from both views is used. Otherwise, the view with fewer holes is selected as the output view. This procedure is effective for unreliably warped pixels. It detects wrong values and rejects them, but at the same time requires a high computational cost since a complicated view analysis (depth comparison and hole counting) is separately performed for each pixel.

VSRS uses a horizontal camera arrangement and utilizes only two references. It is optimized for synthesis of views with small baselines (that is, views that are close to each other). It does not use any vertical camera information and is not well-suited for use in light field synthesis.

In Graziosi et al., "Depth assisted compression of full parallax light fields", IS&T/SPIE Electronic Imaging, International Society for Optics and Photonics (Mar. 17, 2015), a synthesis method that targets light fields and uses both horizontal and vertical information was introduced. The method adopts aspects of Multiple Reference Depth-Image Based Rendering (MR-MR) and utilizes multiple reference views with associated disparities to render the light field.

In this approach, disparities are first forward warped to a target position. Next, a filtering method is applied to the warped disparities to mitigate artifacts such as cracks caused by inaccurate pixel displacement. The third step is the merging of all of the filtered warped disparities. Pixels with smaller depths (i.e., closer to the viewer) are selected. VSRS blends color information from two views with similar depth values and obtains a blurred synthesized view. This is in contrast to Graziosi et al., supra, which utilizes only one view after merging to preserve the high resolution of the reference view. Rendering time is reduced in VSRS due to simple copying of the color information from the single reference rather than interpolating several references.

Finally, the merged elemental image disparity is used to backward warp the color from the references' colors and to generate the final synthesized elemental image.

This view-merging algorithm tends to exhibit quality degradation when the depth values from the reference views are inaccurate. Methods for filtering depth values have been proposed in, for instance, U.S. Pat. No. 8,284,237, C. Fehn, "3D-TV Using Depth-Image-Based Rendering (DIBR)," in Proceedings of Picture Coding Symposium, San Francisco, Calif., USA, (December 2004), and Kwan-Jung Oh et al., "Depth Reconstruction Filter and Down/Up Sampling for Depth Coding in 3-D Video", Signal Processing Letters, IEEE, vol. 16, no. 9, pp. 747, 750, (September 2009), but these approaches undesirably increase the computational requirements of the system and can increase the latency of the display system.

The above MR-DIBR methods enhance light field image quality of compressed light field images using reference depth (or disparity) maps or information and color maps to enable hole filling and crack filling in compressed light field image data sets. Relatedly, a disparity threshold is set as a value that removes the effect of noise in a light field image scene while making the decision whether or not to overwrite merged disparity map pixels due to occlusion.

Accordingly, there is a need for a method to determine an optimal disparity threshold value in a light field compression scheme that overcomes the deficiencies found in the prior art methods.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
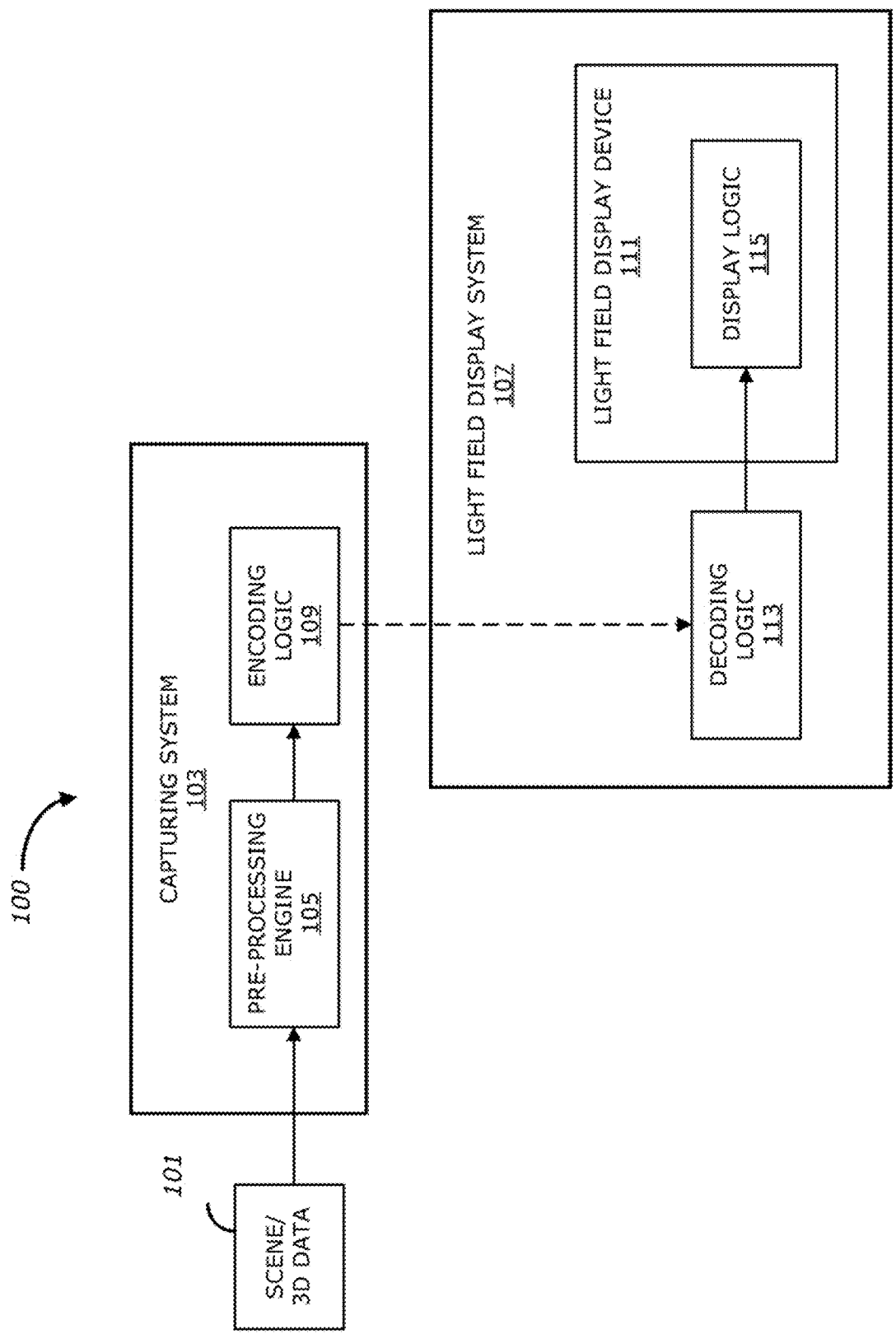
FIG. 1 illustrates a light field imaging system according to one embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment", "an embodiment" or "some embodiments" means that a particular feature, structure, or characteristic described in conjunction with the embodiment can be included in at least one embodiment of the invention. The appearances of the phrase "in one embodiment" in various places in the specification do not necessarily all refer to the same embodiment.

According to one aspect of the invention, scene metadata and input light field images associated with a scene are received. A first encoding operation is performed on the scene metadata and input light field images to generate reference images, reference disparity information, and an order of reference views. A second encoding operation is performed based on the reference images and reference disparity information to output light field encoded data. The light field encoded data includes the encoded reference images, the encoded reference disparity information, and the order of reference views. The light field encoded data is transmitted.

In one embodiment, to perform the first encoding operation on the scene metadata and the input light field images, a subset of the input light field images is selected as the reference images. One or more reference disparity maps are estimated for each of the reference images to produce the reference disparity information. Pre-rendering and quality estimations are performed to produce the order of reference views.

In one embodiment, to perform the pre-rendering and quality estimations, an optimal ordered list of reference views is determined for each of the reference disparity maps based on a distance between the reference views and a target view. Alternatively, an optimal ordered list of reference views is determined for each intermediate view based on an estimated peak signal-to-noise ratio (PSNR). In one embodiment, an Extended Kalman Filter (EXF) is provided to select the optimal ordered list of reference views based on a distance and quality of each reference disparity map in order to reduce noise for each reference view.

In one embodiment, to determine the optimal ordered list of reference views for each intermediate view, a reference view with a lowest error is placed at a head of the optimal ordered list of reference views.

In one embodiment, performing the first encoding operation on the scene metadata and the input light field images further generates reference locations and luminance weights associated with the reference images, where the light field encoded data further includes the reference locations and luminance weights.

In one embodiment, to perform the first encoding operation on the scene metadata and the input light field images, a reference location in each of the reference images is determined to produce the reference locations, and a local luminance level for each of the reference images as compared to a global light field luminance level is determined to produce the luminance weights.

In one embodiment, prior to performing the second encoding operation based on the reference images and the reference disparity information to output the light field encoded data, a first bit budget of a total bit budget for the reference images and a second bit budget of the total bit budget for the reference disparity information are determined. In one embodiment, the performance of the second encoding operation based on the reference images and reference disparity information is based on the first and second bit budgets.

In one embodiment, the first encoding operation is based on multiple-reference depth image-based rendering (MR-DIBR), and the second encoding operation is based on an image or video encoding standard.

In one embodiment, a third encoding operation is performed on the order of reference views based on a third bit budget of the total bit budget.

In one embodiment, the scene metadata includes optical characteristics of a capturing device, and captured data from the capturing device including camera pixel count, camera location(s), lens field of view (FOV), scene composition, scene distance from the camera(s), or display device characteristics.

In one embodiment, the performance of the first encoding operation on the scene metadata and the input light field images further includes a determination of bits per pixel (bpp) configurations that include reference selection adjustment, texture versus disparity map weights, and on/off luminance scaling.

According to another aspect of the invention, light field encoded data including encoded reference images, encoded reference disparity information, and an order of reference views are received. A first decoding operation is performed on the light field encoded data to output decoded reference images and decoded reference disparity information. A second decoding operation is performed based on the decoded reference images, the decoded reference disparity information, and the order of reference views extracted from the light field encoded data to output one or more decoded images.

In one embodiment, to perform the second decoding operation, each reference disparity from the decoded reference disparity information is forward warped to produce a plurality of forward warped reference disparities. Each of the forward warped reference disparities is filtered to generate a plurality of filtered reference disparities. The plurality of filtered reference disparities are merged into a merged disparity. The merged disparity and the decoded reference images are used to backward warp in order to produce the decoded images.

In another embodiment, to perform the second decoding operation, each reference disparity from the decoded reference disparity information is forward warped to produce a plurality of forward warped reference disparities. Each of the forward warped reference disparities is filtered to generate a plurality of filtered reference disparities. A subset of the filtered reference disparities is selected. The subset of the filtered reference disparities is merged into a merged disparity. The merged disparity and the decoded reference images are used to backward warp in order to produce the decoded images.

In one embodiment, to select the subset of the filtered reference disparities, reference views are ordered by their distances to a target view, and a current disparity is set as a disparity of a closest view.

In one embodiment, to merge the subset of the filtered reference disparities, if a disparity value of a reference view is larger than a disparity threshold, a target disparity value is replaced with the disparity value of the reference view. Otherwise, a current disparity value that belongs to the closest view is maintained.

FIG. 1 illustrates a light field imaging system according to one embodiment. Referring to FIG. 1, light field imaging system 100 may include a capturing system 103 and a light field display system 107 that may be communicatively coupled to each other, for example, over a network (not shown), such as the Internet or cloud service. Capturing system 103 may include a capturing device (not shown) such as a light-field camera, action camera, animation camera, camcorder, camera phone, compact camera, digital camera, high-speed camera, mirrorless camera, or pinhole camera. In one embodiment, capturing system 103 includes, but is not limited to, pre-processing engine 105 (also referred to as pre-processing logic, pre-processing module, or pre-processing unit, which may be implemented in software, hardware, or a combination thereof) and compression logic 109 (also referred to as compression engine, compression module, or compression unit, which may be implemented in software, hardware, or a combination thereof).

Pre-processing engine 105 may capture, acquire, receive, create, format, store and/or provide light field input data (or scene/3D data) 101, which may represent an object or a scene, to be utilized at different stages of a compression operation (as discussed in more detail herein below). To do so, pre-processing engine 105 may generate a priori (or pre-processing) information associated with light field input data 101, for example object locations in the scene, bounding boxes, camera sensor information, target display information and/or motion vector information. Moreover, in some embodiments, pre-processing engine 105 may perform stereo matching and/or depth estimation on the light field input data 101 to obtain a representation of the spatial structure of a scene, for example one or more depth maps (or disparity maps) and/or subimages (or subaperture images) associated with the object or scene.

In one embodiment, pre-processing engine 105 may convert the light field input data 101 from data space to display space of light field display device 111. Conversion of the light field input data 101 from data space to display space may be needed for the light field display device 111 to show light field information in compliance with light field display characteristics and the user (viewer) preferences. When the light field input data 101 is based on camera input, for example, the light field capture space (or coordinates) and the camera space (or coordinates) are typically not the same, and as such, the pre-processing engine 105 may need to convert the data from any camera's (capture) data space to the display space. This is particularly the case when multiple cameras are used to capture the light field and only a portion of the captured light field in included in the viewer preference space. This data space to display space conversion is done by the pre-processing engine 105 by analyzing the characteristics of the light field display device 111 and, in some embodiments, the user (viewer) preferences. Characteristics of the light field display device 111 may include, but are not limited to, image processing capabilities, refresh rate, number of hogels and anglets, color gamut, and brightness. Viewer preferences may include, but are not limited to, object viewing preferences, interaction preferences, and display preferences.

In one embodiment, pre-processing engine 105 may take the display characteristics and the user preferences into account and convert the light field input data 101 from data space to display space. For example, if the light field input data 101 includes mesh objects, then pre-processing engine 105 may analyze the display characteristics (such as number of hogels, number of anglets, and field of view (FOV)), analyze the user preferences (such as object placement and viewing preferences), calculate bounding boxes, motion vectors, etc., and report such information to the light field display system 107. In one embodiment, data space to display space conversion may include data format conversion and motion analysis in addition to coordinate transformation. In one embodiment, data space to display space conversion may involve taking into account the position of the light modulation surface (display surface) of the light field display device 111, and the object's position relative to the display surface.

Compression (or encoding) logic 109 may receive the a priori (or pre-processing) information from pre-processing engine 105 for compression. For example, compression logic 109 may execute one or more compression methods at different stages using the a priori information in order to generate compressed information (e.g., reference locations, reference elemental images (EIs), reference disparity maps, luminance weights, an optimal ordered list of reference views, etc.). In one embodiment, the compression methods may be based on image-based rendering (IBR), depth image-based rendering (DIBR), and/or multiple-reference depth image-based rendering (MR-DIBR). In one embodiment, the compression methods may, additionally or alternatively, be based on one or more image compression standards such as Joint Photographic Experts Group (JPEG), JPEG 2000, JPEG XS, or video compression standards (also referred to as video compression methods, video compression algorithms, or video compression codecs), such as Moving Picture Experts Group (MPEG), H.264, High Efficiency Video Coding (HEVC), Theora, RealVideo, RV40, VP9, AV1, Audio Video Interleaved (AVI), Flash Video (FLV), RealMedia, Ogg, QuickTime, and/or Matroska. Compression logic 109 may then communicate the compressed information, for example over a network (not shown), such as the Internet or cloud service, to decompression (or decoding) logic 113 to perform decompression operations. In one embodiment, the compressed information may be stored in a storage device (not shown) to be retrieved (or loaded) by decompression logic 113. The storage device, for example, may be a hard disk drive (HDD), solid state device (SSD), read only memory (ROM), random access memory (RAM), or optical storage media.

As further shown in FIG. 1, light field display system 107 may include, but is not limited to, decompression logic 113 (also referred to as decompression engine, decompression module, or decompression unit, which may be implemented in software, hardware, or a combination thereof) and light field display device 111 communicatively coupled to each other. The light field display device 111 may be any type of light field display device, such as a glasses-based 3D display device, autostereoscopic display device, vergence accommodation conflict (VAC) display device, or VAC-free full parallax 3D display device. As shown, light field display device 111 may include, but is not limited to, display logic 115 (also referred to as display engine, display module, or display unit, which may be implemented in software, hardware, or a combination thereof).

In one embodiment, decompression logic 113 may execute one or more decompression methods on the compressed information, which may be retrieved from the storage device, in order to generate decompressed information (e.g., reference locations, reference EIs, reference disparity maps, luminance weights, etc.). Using the decompressed information, decompression logic 113 may reconstruct the original object or scene represented by light field input data 101. The reconstructed images of the object or scene may be transmitted to display logic 115 to display, modulate or render on light field display device 111. As with the compression methods previously discussed, in one embodiment, the decompression operations may be based on IBR, DIBR, and/or MR-DIBR. In one embodiment, the decompression operations may, additionally or alternatively, be based on one or more image compression standards such as JPEG, JPEG 2000, JPEG XS, or one or more video compression standards, such as MPEG, H.264, HEVC, Theora, RealVideo, RV40, VP9, AV1, AVI, FLV, RealMedia, Ogg, QuickTime, and/or Matroska.

It should be appreciated that while FIG. 1 shows the light field capturing system 103 as being separate from the light field display system 107, in some embodiments the light field capturing system 103 may be part of the light field display system 107. It should also be appreciated that while FIG. 1 shows the pre-processing engine 105 as part of the light field capturing device 103, in some embodiments the pre-processing engine 105 may be part of the light field display system 107 or another system, logic, engine, module or unit. It should further be appreciated that while FIG. 1 shows the compression logic 109 as part of the capturing system 103, in some embodiments, compression logic 109 may be part of the light field display system 107 or another system, logic, engine, module or unit.

Figure 2:
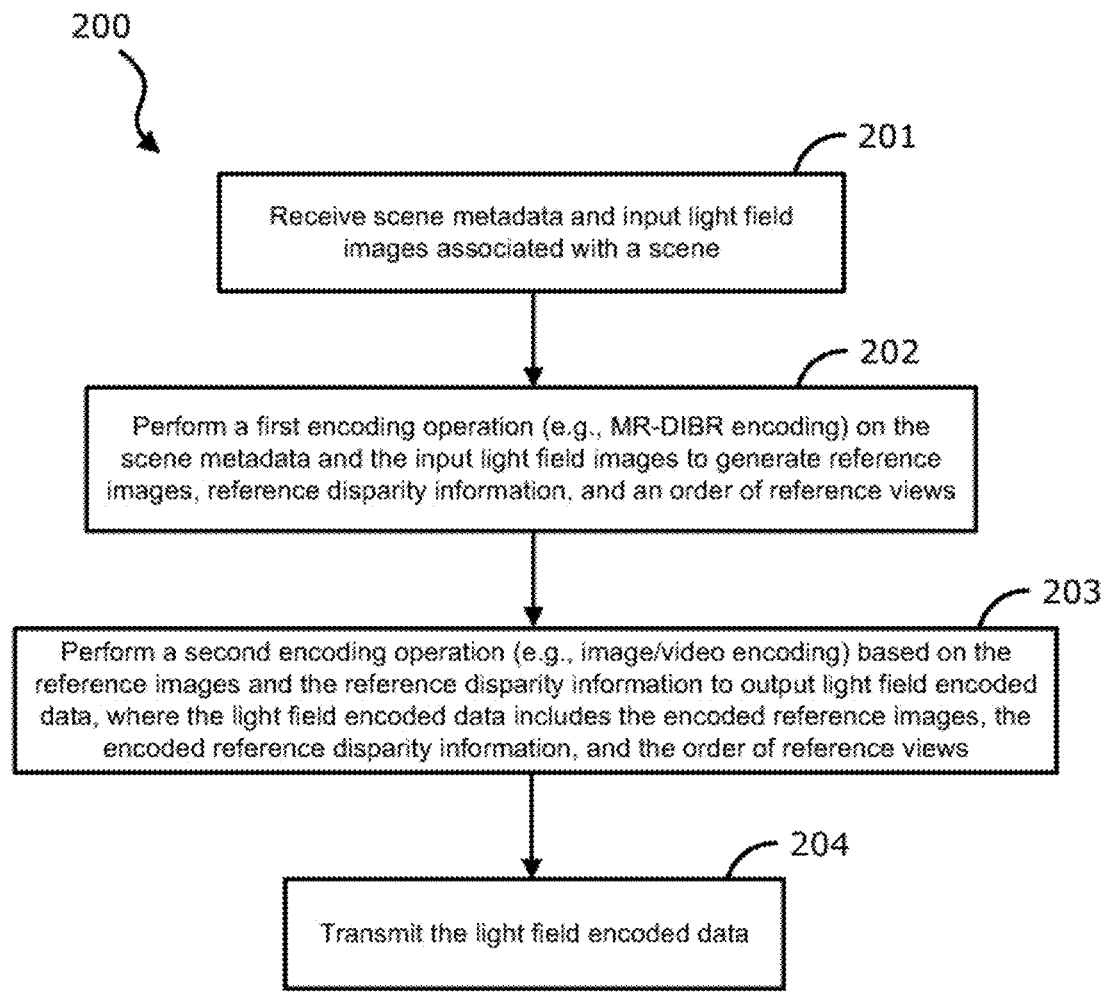
FIG. 2 is a flow diagram illustrating a method of light field encoding according to one embodiment.

FIG. 2 is a flow diagram illustrating a method of light field encoding according to one embodiment. Process 200 may be performed by processing logic that includes hardware (e.g.

circuitry, dedicated logic, etc.), software (e.g., embodied on a non-transitory computer readable medium), or a combination thereof. For example, process 200 may be performed by encoding logic 109 of FIG. 1.

Referring to FIG. 2, at block 201, the processing logic receives scene metadata and input light field images associated with a scene. At block 202, the processing logic performs a first encoding operation (e.g., MR-DIBR encoding) on the scene metadata and the input light field images to generate reference images, reference disparity information, and an order of reference views. At block 203, the processing logic performs a second encoding operation (e.g., image/video encoding) based on the reference images and the reference disparity information to output light field encoded data, where the light field encoded data includes the encoded reference images, the encoded reference disparity information, and the order of reference views. At block 204, the processing logic transmits the light field encoded data.

Figure 3:
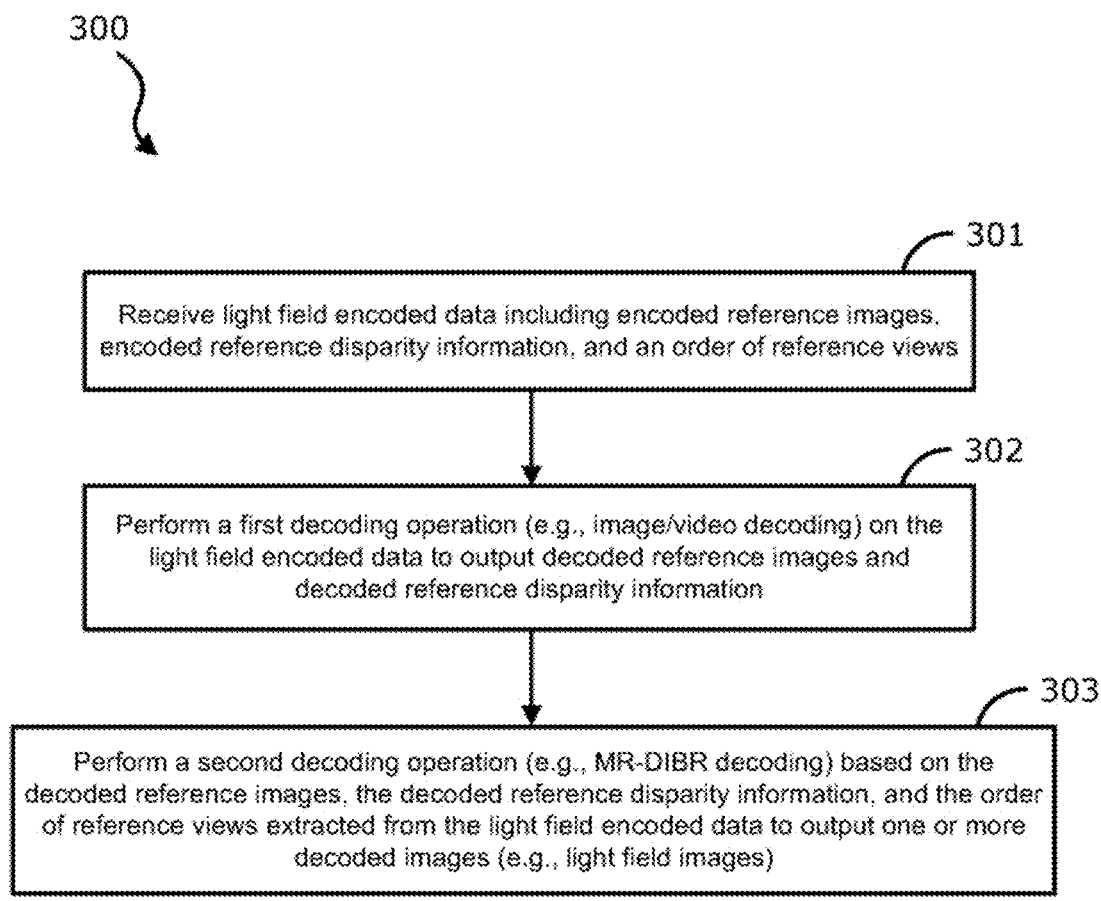
FIG. 3 is a flow diagram illustrating a method of light field decoding according to one embodiment.

FIG. 3 is a flow diagram illustrating a method of light field decoding according to one embodiment. Process 300 may be performed by processing logic that includes hardware (e.g. circuitry, dedicated logic, etc.), software (e.g., embodied on a non-transitory computer readable medium), or a combination thereof. For example, process 300 may be performed by decoding logic 113 of FIG. 1.

Referring to FIG. 3, at block 301, the processing logic receives light field encoded data including encoded reference images, encoded reference disparity information, and an order of reference views. At block 302, the processing logic performs a first decoding operation (e.g., image/video decoding) on the light field encoded data to output decoded reference images and decoded reference disparity information. At block 303, the processing logic performs a second decoding operation (e.g., MR-DIBR decoding) based on the decoded reference images, the decoded reference disparity information, and the order of reference views extracted from the light field encoded data to output one or more decoded images (e.g., light field images).

Turning to the description and the various figures wherein like references denote like elements among the several views, disclosed is a method for determining a disparity threshold value in a light field compression scheme.

Methods and systems exist that enhance light field image quality of compressed light field images using reference depth (or disparity) maps and data and color maps to enable hole filling and crack filling in compressed light field image data sets. A disparity threshold is a user-defined value that removes the effect of noise while making the decision whether or not to overwrite merged disparity map pixels due to occlusion in a light field image scene.

To determine an optimal disparity threshold value, various methods for such determination are disclosed herein below.

In a PSNR-based method for determining a disparity threshold value, an optimal disparity threshold value is based on the PSNR of synthesized (or intermediate) views. PSNR is the peak signal-to-noise ratio, in decibels, between two images. This ratio may be viewed as a quality measurement between the original and a compressed image where the higher the PSNR, the better the quality of the compressed, or reconstructed image. The disparity threshold value that gives the highest average PSNR for the synthesized views is selected as the optimal disparity threshold value.

In an object distance method, to determine a disparity threshold value, the disparity value for each object in the view is first determined. Then the reciprocal of the disparity for each object is computed, i.e.:

$$\frac{1}{disp\_obj1}, \frac{1}{disp\_obj2}, \cdots \frac{1}{disp\_objn}$$

The reciprocal of the disparity of each object is proportional to its depth value. The reciprocal of the disparity threshold is preferably smaller than any of their difference values, i.e.:

$$\frac{1}{disp\_threshold} < \left|\frac{1}{disp\_objm} - \frac{1}{disp\_objn}\right|$$

In a warping process, if:

$$\frac{1}{disp\_threshold} < \frac{1}{disp\_new} - \frac{1}{disp\_current}$$

then the current disparity value is replaced by the new disparity value since an occlusion has occurred. Otherwise, the current disparity value is retained.

In a gradient method, to determine a disparity threshold value, the gradient of the disparity map is taken for each disparity map of the reference views and then the maximum gradient value is selected as the disparity threshold.

Disparity Map Selector Approach

Figure 4A:
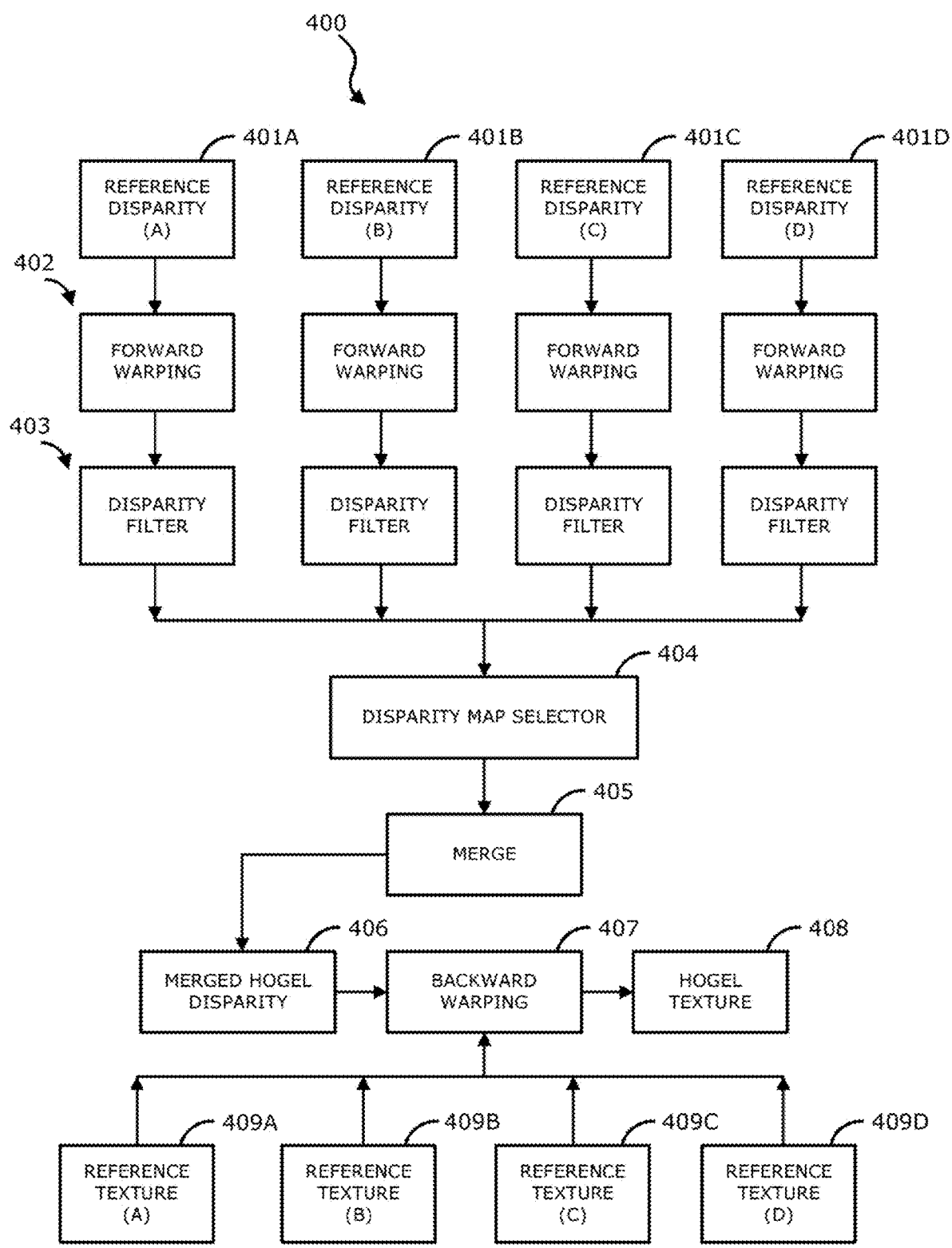
FIG. 4A is a flow diagram illustrating an MR-DIBR operation with disparity map selector according to one embodiment.

MR-DIBR requires relatively high accuracy disparity as input data. FIG. 4A illustrates a flow diagram of an MR-DIBR operation with disparity map selector according to one embodiment. As shown in FIG. 4A, MR-DIBR operation 400 includes:

(1) Perform forward warping 402 for each of reference disparities or disparity maps 401A-D (e.g., EI reference depth), (2) Apply disparity filter 403 (e.g., crack filter) in each of the forward warped reference disparity, and (3) Merge (at block 405) the forward warped and filtered disparity maps into disparity map (or hogel disparity) 406.

(4) Perform backward warping 407 using the merged hogel disparity 406 and reference textures 409A-D to produce hogel texture 408 (e.g., one or more light field images).

In some embodiments, the MR-DIBR operation is performed by processing logic which may include software, hardware, or a combination thereof. It should be appreciated that while FIG. 4A illustrates four reference disparities and four reference textures, in some embodiments, more than four reference disparities and reference textures may be utilized.

In one embodiment, the use of multiple references increases the chance that the disoccluded texture after warping will be present in one of the reference disparities, and therefore hole filling is minimized or completely avoided. This provides a better quality than synthetic hole-filling algorithms. However, it requires a careful selection of the reference elemental images while increasing MR-DIBR processing time and memory usage.

In forward warping 402, the reference disparities 401A-D may be shifted according to the distance between the target elemental image and the reference elemental image, and their respective disparity values. In order to reduce the memory usage of multiple references, only the disparity is used for forward warping. Due to round-off and quantization errors, cracks may appear in the forward warped disparity. Hence, disparity filter 803 may be used to detect the erroneous disparity values and correct them with neighboring disparities. The warped and filtered disparities are then merged together (at block 405), and since multiple references are used, there is a probability that the disoccluded view will be present in one of the references. Finally, in backward warping stage 407 the merged hogel disparity 406 is used to indicate the location in the reference images to obtain the hogel texture 408.

In some embodiments, for ideal cases where the disparity map is the same as ground truth, the resulting merged disparity map 406 may not depend on the order of the merging operation. On the other hand, for non-ideal light field images, the reference disparity maps inevitably come with undesirable noise and the merging operation must be performed in a particular order to obtain an optimal merged disparity map 406.

Figure 4B:
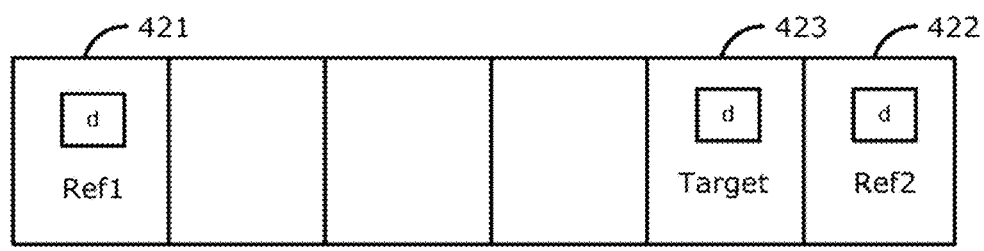
FIG. 4B is a diagram illustrating a warping disparity map from ideal reference disparity maps.

FIG. 4B illustrates a warping disparity map from ideal reference disparity maps. For ground truth or ideal disparity, FIG. 4B shows the disparity value of a target area is equal to d, which is the same in both Ref1's disparity map 421 and in Ref2's disparity map 422. However, for real-life light field images, such as images captured with a high resolution camera array or a lenslet-based light field camera, the disparity map is generated by a disparity estimation algorithm and includes noise. It is assumed the distribution of the noise is Gaussian White noise $N(0, \sigma^2)$, and that disparity_Ref1 and disparity_Ref2 follow normal distribution of $N(d, \sigma^2)$, where the mean value is d and the variance is $\sigma^2$.

To compute a warped target disparity map 423 from the reference image views, the formula is:

$$\text{disparity\_target} = \text{distance} * \text{disparity\_reference}.$$

Considering that disparity_reference follows $N(d, \sigma^2)$ and the distance is a constant coefficient, the warped target disparity value follows:

$$N(d*\text{distance}, \text{distance}^2*\sigma^2).$$

An image region with a smaller disparity (or larger depth) means that particular image region is closer to the viewer when displayed. In an MR-DIBR merging operation (e.g., at block 405 of FIG. 4A), the values that come from the regions of lower disparity take priority and are over-written on the higher disparity values. Based on the assumption of identically distributed Gaussian noise, if the Ref1 disparity map and the Ref2 disparity map are assumed as the input, either has the same probability of selection as the reference area, because they have identical disparity values.

If Ref1 is selected as the reference view, given the identically distributed reference disparity, the average error of warping disparity can be analyzed by the central limit theorem (CLT). The average error is thus equal to the variance of target disparity, where $\text{var\_target} = \sigma^2 * \text{distance ref1} = 4\sigma^2$.

If Ref2 is selected as the reference view, the average error will be the $\sigma^2 * \text{distance\_ref2} = \sigma^2$, which is smaller than $4\sigma^2$. Therefore, it can be seen that in the merging operation, if the reference images have the same disparity, then the one closest to the target location should be selected as that reference image and will add the smallest error to the merged disparity map.

In one embodiment, prior to merging the forward warped and filtered disparity maps (at block 405), disparity map selector method 404 may perform the operation of selecting which disparity maps (e.g., a subset of the filtered disparity maps) should be used in the disparity map merging operation of the MR-DIBR operation 400. For example, disparity map selector 404 first orders the reference views by their distances to the target view. The current disparity map is then set as the disparity map of the closest view. During the merging process (at block 405), if the disparity value of another reference view is larger than the disparity threshold, the target's disparity value is replaced by the new disparity value. Otherwise, the current disparity value (which belongs to the closest reference view) is maintained.

Pre-Renderer and Quality Estimation

In one embodiment, when an image is processed by the disparity map selector method 404, an order of reference views for the disparity map is based on the distance between the reference views and the target view. The assumption for the disparity map selector 404 is that the noise is the same for all reference views. In an actual non-ideal case, environmental factors such as ambient light intensity, sensor uniformity and optical design are present and the noise may vary slightly for each of the reference views. In one embodiment, a pre-renderer in an encoder (e.g., encoding logic 109) is used to determine an optimal ordered list of reference views for each intermediate view based on the estimated PSNR. In other words, the pre-renderer puts the reference view with lowest error at the head of the list array to generate the order of reference views.

In another embodiment, to reduce the effect of the noise, an Extended Kalman Filter (EXF) may be provided to select the optimal order of reference views based on distance and quality of disparity map. Since the EXF depends on the distribution of noise, the accuracy of the noise variance on the disparity map may determine the performance of EXF system.

Figure 5:
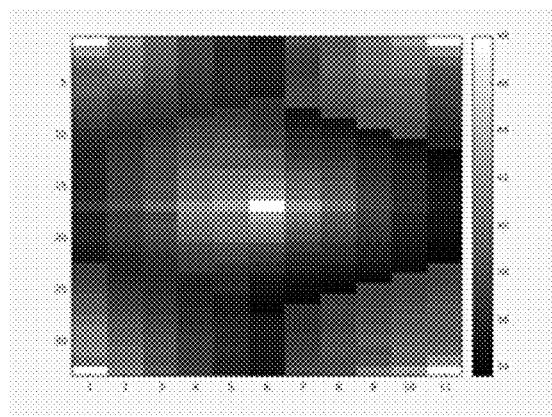
FIG. 5 is a diagram illustrating a peak signal-to-noise ratio (PSNR) map without a pre-renderer according to one embodiment.
Figure 6:
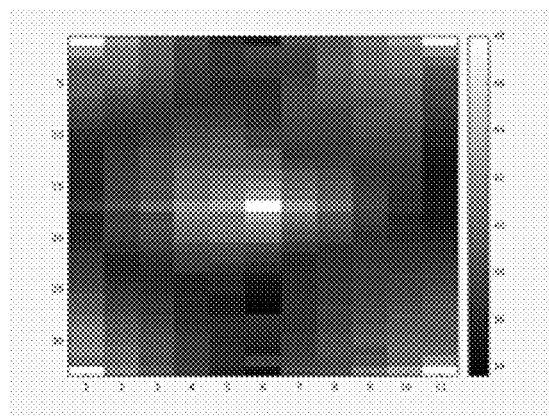
FIG. 6 is a diagram illustrating a PSNR map with the pre-renderer according to one embodiment.

Without the pre-renderer, a hollow area with low PSNR may be found on top right and bottom right portions of the PSNR map of FIG. 5. When adding the pre-renderer to the encoder, the PSNR of the intermediate views increases in those areas as shown in the PSNR map of FIG. 6. In one embodiment, the optimal order of reference views may be an additional property file generated by the encoder, which is utilized by the decoder. The pre-renderer improves the efficiency of the decoder as well. Since the decoder receives information regarding reference view order, it can omit the high overhead process of searching the nearest neighboring reference views.

Localized Disparity Threshold

In one embodiment, instead of finding a single disparity threshold for the entire light field image, it is also possible to identify a localized disparity threshold for each disparity map merging operation. A single disparity threshold for the entire image can improve image processing speed since only one disparity threshold need be calculated. However, localized disparity thresholds can improve the final reconstruction quality though they require additional calculations to determine the increased number of disparity thresholds.

Disparity thresholds may be calculated for the entire light field, for a certain image in the light field or for an image segment in the light field image. A localized disparity threshold value can be calculated using one of the above disclosed disparity threshold calculation methods, but only for the target image or a region of a target image. For example, if the localized disparity threshold value is being calculated for the target image, it will change every time a new target is calculated.

If the disparity threshold is being calculated for a region in the target image, it is noted that one part of the target image uses one threshold and another part uses a different threshold. These thresholds are preferably recalculated for each of the different regions in different target images.

Figure 7:
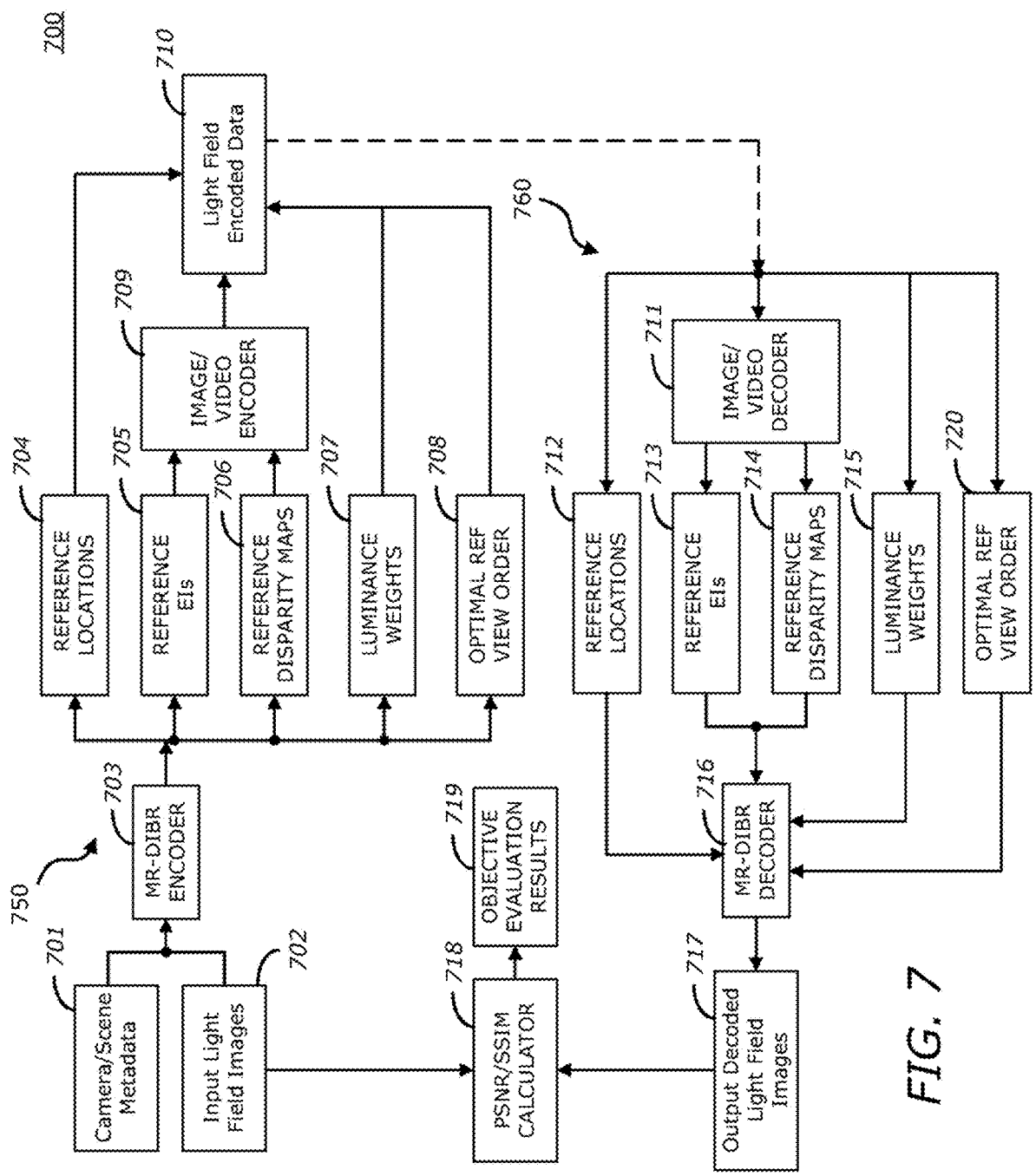
FIG. 7 is a block diagram illustrating a light field image encoding system with an optimal order of reference views according to one embodiment.

FIG. 7 is a block diagram illustrating a light field image encoding (or compression) system with an optimal order of reference views according to one embodiment. Referring to FIG. 7, the light field encoding system (or codec) 700 may include an encoding stage 750 and a decoding stage 760. In some embodiments, encoding stage 750 and decoding stage 760 and associated modules (e.g., modules 703, 709, 711, 716, 718) included therein may be implemented in software, hardware, or a combination thereof. In one embodiment, encoding stage 750 may be implemented as part of capturing system 103 of FIG. 1, and decoding stage 760 may be implemented as part of light field display system 107 of FIG. 1. In another embodiment, in addition to encoding stage 750, capturing system 103 may include some portions of decoding stage 760, with light field display system 107 including the remaining portions of decoding stage 760.

With continued reference to FIG. 7, in one embodiment, encoding stage 750 may include MR-DIBR encoder 703, image/video encoder 709, and peak signal-to-noise ratio (PSNR)/structural similarity index (SSIM) calculator 718. In another embodiment, PSNR calculator 718 may instead be included in decoding stage 760, as described in more detail herein below. As shown, camera (or scene) metadata 701 and input light field images 702 are provided to MR-DIBR encoder 703. In one embodiment, metadata 701 may include optical characteristics of a capturing device and the captured data, such as camera pixel count, camera location(s), lens FOV, scene composition, its distance from the camera(s), and/or display device characteristics.

Figure 8:
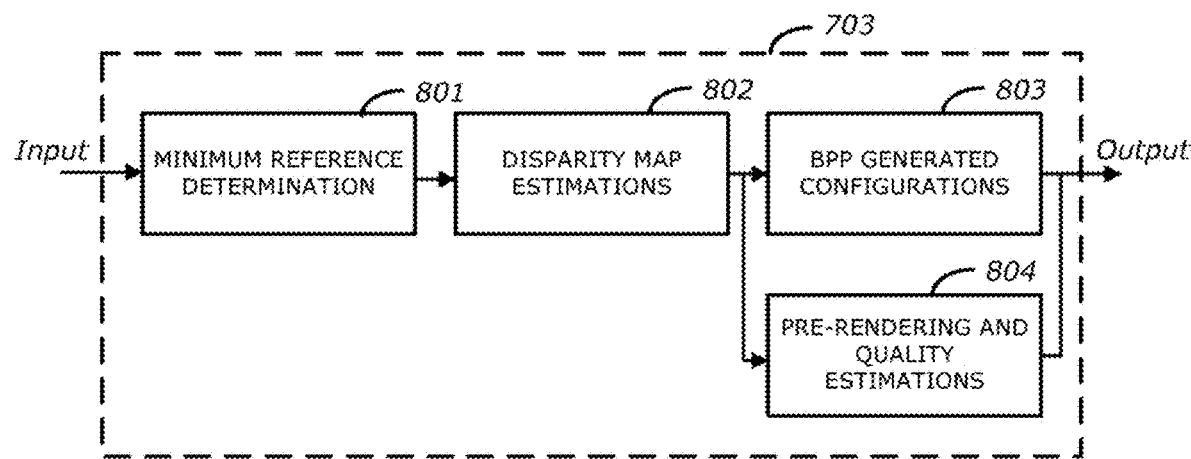
FIG. 8 is a block diagram illustrating an MR-DIBR encoder using pre-rendering and quality estimation steps according to one embodiment.

Referring now to FIG. 8, which is a block diagram illustrating an example of MR-DIBR encoder 703 according to one embodiment, MR-DIBR encoder 703 receives and utilizes metadata 701 and input light field images 702 (e.g., elemental images, hogels) to determine and generate a minimum number of reference EIs 705 (at block 801) required to reconstruct the full light field along with reference locations 704 in reference EIs 705 to obtain final light field images. For example, a selection process called a visibility test may be invoked to determine a subset of elemental images from input light field images 702 to be rendered. That is, the subset of elemental images is used as references for synthesizing the entire light field. In one embodiment, the visibility test selects the subset of elemental images in order to reduce not only the overall rendering computation but also the bandwidth. In one embodiment, the visibility test incorporates a trade-off between real-time implementation requirements (e.g., highly parallelizable solution, minimum dependency between elements) and content redundancy (e.g., correlation between elements, high compression and power savings).

MR-DIBR encoder 703 then calculates or estimates one or more reference disparity maps for each of the generated reference EIs 705 (at block 802), thereby producing a number of reference disparity maps 706. Once the reference EIs 705 and disparity maps 706 are determined, a target bit rate, or bits per pixel (bpp) value, is generated to configure a display-matched encoding stage. That is, bpp generated configurations are used to configure the display-matched encoding stage (at block 803). In one embodiment, the bpp generated configurations may include reference selection adjustment, texture versus disparity map weights, and/or on/off luminance scaling. In one embodiment, if a higher quality reconstruction is necessary, additional reference elemental images and reference depth maps may be added to the encoding stage. At block 804, MR-DIBR encoder 703 also performs pre-rendering and quality estimations to determine and generate an optimal order of reference views 708, as previously described, and for brevity sake, is not described again.

Referring back to FIG. 7, in one embodiment, the display-matched encoding stage uses image (or video) encoder 709 (e.g., JPEG, JPEG 2000, or JPEG XS encoder, or MPEG, H.264, HEVC, Theora, RealVideo, RV40, VP9, AV1, AVI, FLV, RealMedia, Ogg, QuickTime, or Matroska encoder) to further compress the reference EIs 705 (or reference textures) and reference disparity maps 706. In one embodiment, prior to initiating encoder 709, the bit budget for the reference EIs 705 (e.g., between 80-85% of total bit budget) and reference disparity maps 706 (e.g., between 15-20% of the total bit budget) are determined, and the bit budgets may be used as inputs for encoder 709.

In one embodiment, encoder 709 may compress (or encode) reference EIs 705 and reference disparity maps 706 (in accordance with the bit budget, in one embodiment) in order to generate compressed information (e.g., compressed reference EIs, disparity maps). The compressed information and reference locations 704 may be included in light field encoded data 710 (e.g., an encoded light field file) for transmission.

In one embodiment, luminance variations in a light field image are supported in encoding stage 750. For example, prior to encoding reference EIs 705, MR-DIBR encoder 703 may determine a local luminance level (which may include a luminance weight or luminance scaling parameter of each color component) of each of the reference EIs 705, as compared to a global light field luminance level, to produce a number of luminance weights 707 corresponding reference EIs 705. The local luminance level of each reference EI may be preserved by passing luminance weights 707 to light field encoded data 710 for transmission, for example over a network. Accordingly, light field encoded data 710 includes reference locations 704, luminance weights 707, encoded reference EIs and encoded reference disparity maps, and the optimal order of reference views 708.

Still referring to FIG. 7, decoding stage 760 includes image (or video) decoder 711 and MR-MR decoder 716. In one embodiment, decoding stage 760 may further include PSNR/SSIM calculator 718. As shown, light field encoded data 710 is transmitted to decoder 711 (e.g., JPEG, JPEG 2000, or JPEG XS decoder, or MPEG, H.264, HEVC, Theora, RealVideo, RV40, VP9, AV1, AVI, FLV, RealMedia, Ogg, QuickTime, or Matroska decoder) to decode (or decompress) the compressed (or encoded) reference EIs and reference disparity maps. The decoded reference EIs 713 and reference disparity maps 714 are provided to MR-DIBR decoder 716 for further decoding. Reference locations 712 and luminance weights 715 (which may be the same as reference locations 704 and luminance weights 707, respectively) included in light field encoded data 710 may also be extracted to provide to MR-DIBR decoder 716 for decoding. In one embodiment, MR-DIBR decoder 716 may perform the MR-DIBR operation 400, as previously described with respect to FIG. 4A, and for brevity sake, is not described again. Using reference locations 712, reference EIs 713, reference disparity maps 714, and luminance weights 715, MR-DIBR decoder 716 may decode reference EIs 713 and reference disparity maps 714 so as to generate output decoded light field images 717, where decoded light field images 717 may be modulated by a light field display system (e.g., light field display system 107 of FIG. 1). As previously described, since MR-DIBR decoder 716 receives information regarding reference view order 720 (which may be the same as reference view order 708), it can omit the high overhead process of searching the nearest neighboring reference views.

In one embodiment, decoded light field images 717 and input light field images 702 may be communicated to PSNR/SSIM calculator 718 to compute the PSNR (e.g., the overall system distortion) by comparing the decoded light field images 717 to the original input light field images 702. That is, decoded light field images 717 and input light field images 702 may be used in PSNR and SSIM calculations for determining objective image quality performance of MR-DIBR encoder 703 and MR-DIBR decoder 716. For example, PSNR calculator 718 may calculate the PSNR by taking a ratio between the original data from input light field images 702 and the error (or noise) introduced by the compressions, which may be obtained from decoded light field images 717. The PSNR produced from PSNR calculator 718 may be included in evaluation results 719 for subsequent evaluation of the performance of the overall system. Performance of the overall system for example can be measured by the overall bit rate and distortion, which can be used to improve bit rate allocation among different components.

In one embodiment, MR-DIBR decoder 716 in decoding stage 760 may utilize integer disparity values. In some embodiments, use of integer disparity values is advantageous when the target destination is a light field display because each pixel in the light field image is associated with a specific direction. However, in some embodiments, the use of integer disparity can be changed to fractional disparity if the target destination is not a light field display. Going to fractional disparity in the decoding stage 760 improves the PSNR in the image without causing extra burden on the computational load of the system.

Figure 9:
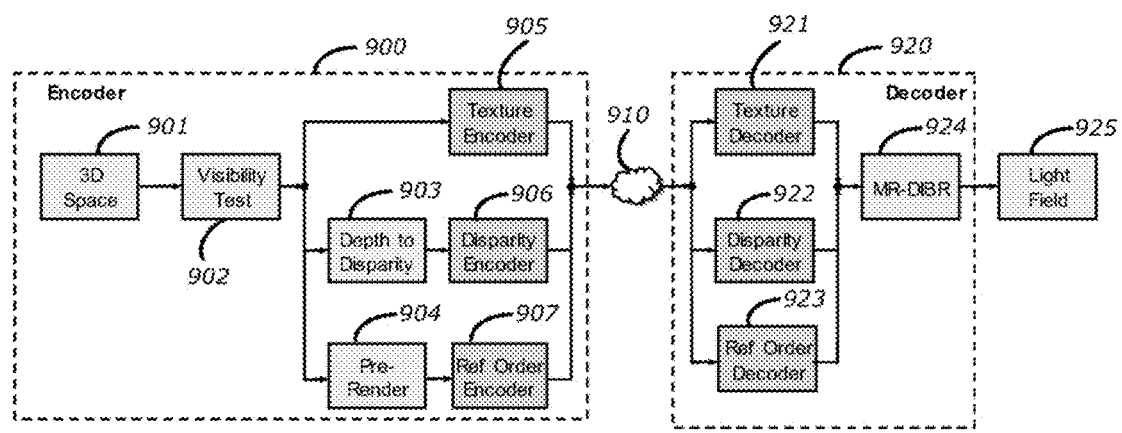
FIG. 9 is a block diagram illustrating an example of a light field compression system using pre-rendering, reference order encoding and reference order decoding according to one embodiment.

FIG. 9 is a block diagram illustrating an example of a light field compression system using pre-rendering, reference order encoding and reference order decoding according to one embodiment. Referring to FIG. 9, the light field compression system may include encoder 900 and decoder 920. In some embodiments, encoder 900 and decoder 920 and associated modules or logic (e.g., modules 901-907 and 921-925) included therein may be implemented in software, hardware, or a combination thereof. In one embodiment, encoder 900 may be implemented as part of capturing system 103 of FIG. 1, and decoder 920 may be implemented as part of light field display system 107 of FIG. 1. In another embodiment, in addition to encoder 900, capturing system 103 may include some portions of decoder 920, with light field display system 107 including the remaining portions of decoder 920.

As shown in FIG. 9, encoder 900 includes a visibility testing module 902, depth to disparity converter 903, pre-rendering module 904, and reference view order encoder 907. In one embodiment, visibility testing module 902, depth to disparity converter 903, and pre-rendering module 904 may respectively perform the visibility test, depth to disparity conversion, and pre-rendering and quality estimations (as previously described with respect to FIGS. 4A, 7 and 8), and for brevity sake, are not described again. In addition, in encoder 900, to perform compression of reference elemental images, reference disparity maps and optimal reference view order, texture encoder 905, disparity encoder 906, and reference view order encoder 907 are added. In one embodiment, texture encoder 905, disparity encoder 906, and reference view order encoder 907 may perform the same or similar operations. However, their contribution to bitrate may be different. For example, in one embodiment, a first percentage range of bit budget may be used for texture encoder 905, a second percentage range of the bit budget may be used for disparity encoder 906, and a third percentage range of bit budget may be used for reference view order encoder 907.

In one embodiment, encoders 905-907 may invoke (or apply) methods similar to intra encoding in H.264/MPEG-4 Advanced Video Coding (AVC) or H.265 High Efficiency Video Coding (HEVC) algorithm. In one embodiment, encoders 905-906 may respectively transform red, green, and blue (RGB) values of reference texture and reference disparities (or disparity maps) to YCoCg color space. YCoCg color space refers to a color space that is formed from a transformation of an associated RGB color space into a luma value (which may be denoted as Y), two chroma values called chrominance green (Cg), and chrominance orange (Co). Each color channel may be divided into blocks of size, for example 4×4, and an integer transformation may be applied. Transform coefficients of the transformation may be quantized and the coefficients may be encoded using a signal encoder, such as differential pulse-code modulation (DPCM) scheme for the DC value, and a run-length encoder for the AC values. Subsequently, in one embodiment, an entropy encoder (e.g., Huffman coding) may be utilized to further compress the coded coefficients. In one embodiment, the final quality of the texture, as well as the amount of bits used to code the texture, is controlled by the quantization parameter. In some embodiments, the encoded texture, encoded disparity, and encoded optimal reference view order (respectively generated by encoders 905-907) may be packetized and transmitted to decoder 920 over network 910 for decoding.

In some embodiments, the encoding (or compression) method explained above may generate only a subset of views. The remaining views may be synthesized directly at the display system. The synthesis of other views can be made immediately after receiving the references and all in parallel, since they do not depend on each other. In one embodiment, it is assumed that the rendering process is optimal and that a viewer does not perceive any artifacts. In one embodiment, to improve the quality of view-dependent features, residual information may be sent. That is, the difference (or delta) between the original view and the synthesized view using the recently received references may be transmitted to decoder 920 over network 910 for decoding. This requires the rendering or acquisition of the full light field data. A better compromise between compression and quality are algorithms that identify critical areas of the light field and perform rendering only for those specific parts.

Turning now to decoder 920, as shown decoder 920 includes texture decoder 921, disparity decoder 922, reference view order decoder 923, and MR-DIBR logic 924. MR-DIBR logic 924 may perform the MR-DIBR operation 400, as previously described in FIG. 4A, and for brevity sake, is not described again.

Texture decoder 921, disparity decoder 922, and reference view order decoder 923 may respectively receive the encoded texture, encoded disparity, and encoded optimal reference view order over network 910 for decoding. In one embodiment, the decoding procedure is parallelizable to the encoding procedure. The encoded reference texture, reference disparity, and reference view order can be decoded simultaneously since they are not dependent on each other. Similarly, the syntheses for the remaining views do not depend on other non-reference views and can be performed in parallel. However, decoder 920 needs to identify the received packets and associate the decoded information to the correct elemental image position. Therefore, in one embodiment, header information is annexed to the bit stream of each elemental image prior to transmission to decoder 920, so that decoder 920 can place the decoded information in the reconstructed light field image 925. The header in one embodiment may include a unique identification of the elemental image, a coordinate of the elemental image in the light field, and the quantization parameter used to compress the texture information.

In some embodiments, due to the strict timing requirements for real-time decoding and display of a light field display system, the latency of the bit stream can be difficult to manage. With higher compression, decoder 920 needs to perform more operations to reconstruct the light field 925, which may not be ready in time for display. Another factor that influences decoder 920's performance is the memory availability. Constraints of memory at decoder 920 may impose restrictions on the light field compression system as well. Therefore, the display hardware of the light field display system may influence the light field compression system, which may force the entire system to be re-designed. In summary, the design space of a compression algorithm for full parallax light field display system may need to take into account various factors, such as decoding time, available memory, pixel dimension, power consumption, etc.

Figure 10:
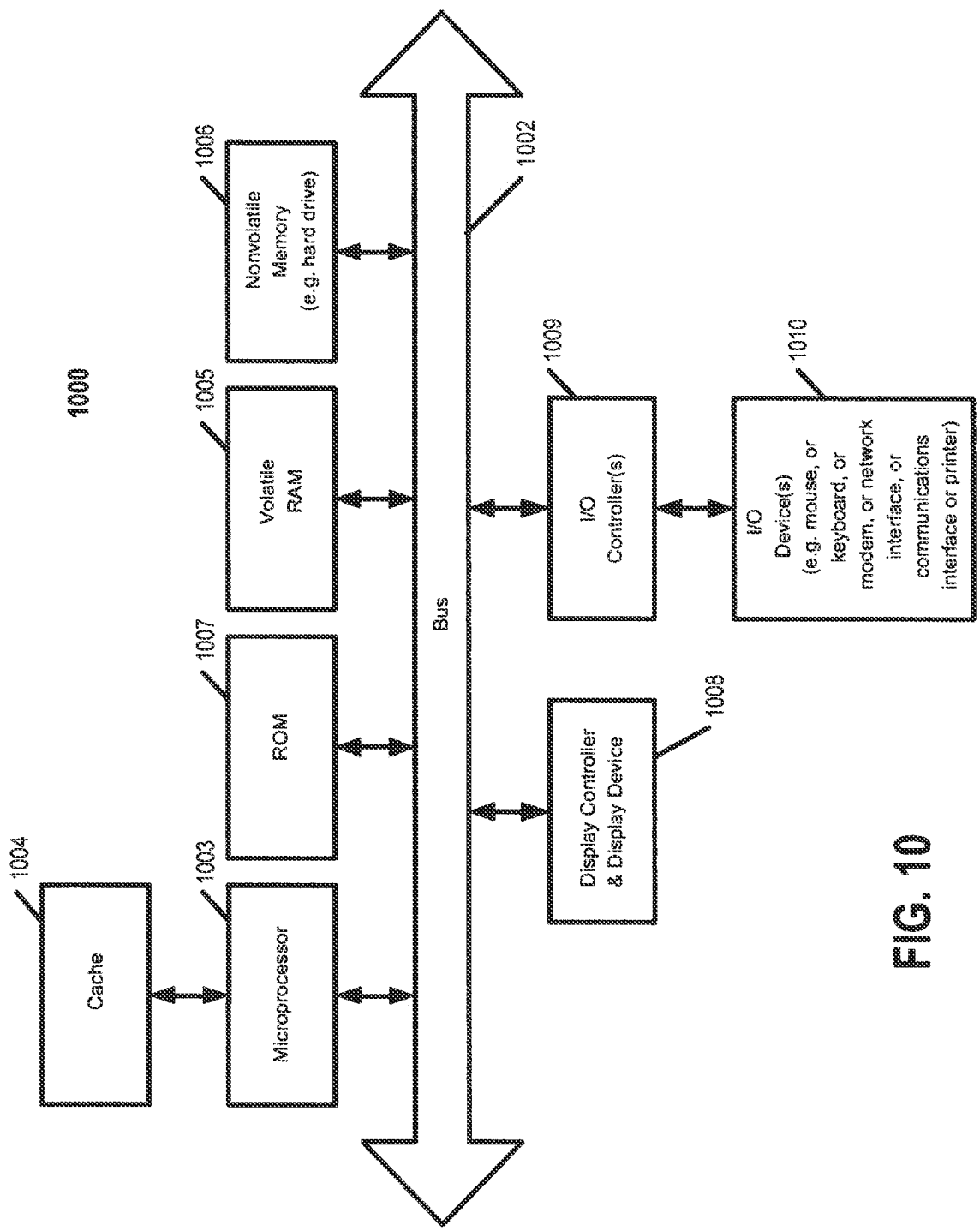
FIG. 10 is a block diagram of a data processing system, which may be used with one embodiment of the invention.

FIG. 10 is a block diagram of a data processing system, which may be used with one embodiment of the invention. For example, the system 1000 may be used as part of capturing system 103 and/or light field display system 107, as shown in FIG. 1, to implement the various systems (e.g., system 700) and operations (e.g., operation 400 of FIG. 4A) as previously described. Note that while FIG. 10 illustrates various components of a computer system, it is not intended to represent any particular architecture or manner of interconnecting the components, as such details are not germane to the invention. It will also be appreciated that network computers, handheld computers, mobile devices (e.g., smartphones, tablets) and other data processing systems which have fewer components or perhaps more components may also be used with the invention.

As shown in FIG. 10, the system 10000, which is a form of a data processing system, includes a bus or interconnect 1002 which is coupled to one or more microprocessors 1003 and a ROM 1007, a volatile RAM 1005, and a non-volatile memory 1006. The microprocessor 1003 is coupled to cache memory 1004. The bus 1002 interconnects these various components together and also interconnects these components 1003, 1007, 1005, and 1006 to a display controller and display device 1008, as well as to input/output (I/O) devices 1010, which may be mice, keyboards, modems, network interfaces, printers, and other devices which are well-known in the art.

Typically, the input/output devices 1010 are coupled to the system through input/output controllers 1009. The volatile RAM 1005 is typically implemented as dynamic RAM (DRAM) which requires power continuously in order to refresh or maintain the data in the memory. The non-volatile memory 1006 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 10 shows that the non-volatile memory is a local device coupled directly to the rest of the components in the data processing system, a non-volatile memory that is remote from the system may be utilized, such as, a network storage device which is coupled to the data processing system through a network interface such as a modem or Ethernet interface. The bus 1002 may include one or more buses connected to each other through various bridges, controllers, and/or adapters, as is well-known in the art. In one embodiment, the I/O controller 1009 includes a Universal Serial Bus (USB) adapter for controlling USB peripherals. Alternatively, I/O controller 1009 may include an IEEE-1394 adapter, also known as FireWire adapter, for controlling FireWire devices.

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by any claims in any subsequent application claiming priority to this application.

For example, notwithstanding the fact that the elements of such a claim may be set forth in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus, if an element can be understood in the context of this specification as including more than one meaning, then its use in a subsequent claim must be understood as being generic to all possible meanings supported by the specification and by the word itself.

The definitions of the words or elements of any claims in any subsequent application claiming priority to this application should be, therefore, defined to include not only the combination of elements which are literally set forth, but all equivalent structure, material or acts for performing substantially the same function in substantially the same way to obtain substantially the same result. In this sense, it is therefore contemplated that an equivalent substitution of two or more elements may be made for any one of the elements in such claims below or that a single element may be substituted for two or more elements in such a claim.

Although elements may be described above as acting in certain combinations and even subsequently claimed as such, it is to be expressly understood that one or more elements from a claimed combination can in some cases be excised from the combination and that such claimed combination may be directed to a sub-combination or variation of a sub-combination.

Insubstantial changes from any subsequently claimed subject matter as viewed by a person with ordinary skill in the art, now known or later devised, are expressly contemplated as being equivalently within the scope of such claims. Therefore, obvious substitutions now or later known to one with ordinary skill in the art are defined to be within the scope of the defined elements.

Any claims in any subsequent application claiming priority to this application are thus to be understood to include what is specifically illustrated and described above, what is conceptually equivalent, what can be obviously substituted and also what essentially incorporates the essential idea of the invention.

What is claimed is:

1. A computer-implemented method of light field image encoding, comprising:
   receiving scene metadata and input light field images associated with a scene;
   performing a first encoding operation on the scene metadata and the input light field images to generate reference images, reference locations and luminance weights associated with the reference images, reference disparity information, and an order of reference views;
   performing a second encoding operation based on the reference images and the reference disparity information to output light field encoded data, wherein the light field encoded data includes encoded reference images, the reference locations and luminance weights, encoded reference disparity information, and the order of reference views; and
   transmitting the light field encoded data.

2. The method of claim 1, wherein performing the first encoding operation on the scene metadata and the input light field images comprises:
   selecting a subset of the input light field images as the reference images,
   estimating one or more reference disparity maps for each of the reference images to produce the reference disparity information, and
   performing pre-rendering and quality estimations to produce the order of reference views.

3. The method of claim 2, wherein performing the pre-rendering and quality estimations comprises:
   (i) determining an optimal ordered list of reference views for each of the reference disparity maps based on respective distances between the reference views and a target view, or
   (ii) determining an optimal ordered list of reference views for each intermediate view based on an estimated peak signal-to-noise ratio (PSNR).

4. The method of claim 3, further comprising providing an Extended Kalman Filter (EXF) to select the optimal ordered list of reference views based on a distance and quality of each reference disparity map in order to reduce noise for each reference view.

5. The method of claim 3, wherein determining the optimal ordered list of reference views for each intermediate view based on an estimated peak signal-to-noise ratio (PSNR) comprises placing a reference view with a lowest error at a head of the optimal ordered list of reference views.

6. The method of claim 1, wherein performing the first encoding operation on the scene metadata and the input light field images further comprises:
   determining a reference location in each of the reference images to produce the reference locations, and
   determining a local luminance level for each of the reference images as compared to a global light field luminance level to produce the luminance weights.

7. The method of claim 1, wherein prior to performing the second encoding operation based on the reference images and the reference disparity information to output the light field encoded data,
   determining a first bit budget of a total bit budget for the reference images and a second bit budget of the total bit budget for the reference disparity information.

8. The method of claim 7, wherein performing the second encoding operation based on the reference images and reference disparity information is further based on the first and second bit budgets.

9. The method of claim 8, further comprising: performing a third encoding operation on the order of reference views based on a third bit budget of the total bit budget.

10. The method of claim 1, wherein the first encoding operation is based on multiple-reference depth image-based rendering (MR-DIBR), and the second encoding operation is based on an image or video encoding standard.

11. The method of claim 1, wherein the scene metadata comprises:
    (i) optical characteristics of a capturing device, and
    (ii) captured data from the capturing device including camera pixel count, camera location(s), lens field of view (FOV), scene composition, scene distance from the camera(s), or display device characteristics.

12. The method of claim 1, wherein performing the first encoding operation on the scene metadata and the input light field images further comprises: determining bits per pixel (bpp) configurations that include reference selection adjustment, texture versus disparity map weights, and on/off luminance scaling.

13. A computer-implemented method of light field image decoding, comprising:
    receiving light field encoded data including encoded reference images, encoded reference disparity information, and an order of reference views;
    performing a first decoding operation on the light field encoded data to output decoded reference images and decoded reference disparity information; and
    performing a second decoding operation based on the decoded reference images, the decoded reference disparity information, and the order of reference views extracted from the light field encoded data to output one or more decoded images, wherein performing the second decoding operation comprises:
    forward warping each reference disparity from the decoded reference disparity information to produce a plurality of forward warped reference disparities,
    filtering each of the forward warped reference disparities to generate a plurality of filtered reference disparities,
    merging the plurality of filtered reference disparities into a merged disparity, and
    backward warping, using the merged disparity and the decoded reference images, to produce the one or more decoded images.

14. The method of claim 13, further comprising:
    selecting a subset of the filtered reference disparities,
    merging the subset of the filtered reference disparities into a merged disparity.

15. The method of claim 14, wherein selecting the subset of the filtered reference disparities comprises:

ordering reference views by their distances to a target view, and setting a current disparity as a disparity of a closest view.

16. The method of claim 15, wherein merging the subset of the filtered reference disparities comprises:

if a disparity value of a reference view is larger than a disparity threshold, replacing a target disparity value with the disparity value of the reference view, otherwise, maintaining a current disparity value that belongs to the closest view.

17. The method of claim 13, wherein the first decoding operation is based on an image or video decoding standard, and the second decoding operation is based on multiple-reference depth image-based rendering (MR-DIBR).

18. The method of claim 13, further comprising:

computing a peak signal-to-noise ratio (PSNR) by comparing the one or more decoded images to input light field images of a scene to determine objective image quality performance of the second decoding operation.

19. The method of claim 13, wherein the one or more decoded images include light field images.

20. The method of claim 19, wherein the reference images include elemental images (EIs).

21. The method of claim 13, wherein the decoded reference images include at least four (4) reference images, and the decoded reference disparity information includes at least four (4) reference disparities.

22. The method of claim 13, wherein performing the second decoding operation based on the decoded reference images, the decoded reference disparity information, and the order of reference views extracted from the light field encoded data further comprises omitting a search for nearest neighboring reference views.

* * * * *